United States Patent
Yoo et al.

(10) Patent No.: US 9,591,492 B2
(45) Date of Patent: Mar. 7, 2017

(54) USER EQUIPMENT, BASE STATIONS, AND METHODS ALLOWING FOR HANDLING OF COLLIDING CHANNEL STATE INFORMATION REPORTS

(71) Applicant: QUALCOMM Incorporated, San Diego, CA (US)

(72) Inventors: Taesang Yoo, San Diego, CA (US); Wanshi Chen, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 13/671,404

(22) Filed: Nov. 7, 2012

(65) Prior Publication Data

US 2013/0114455 A1  May 9, 2013

Related U.S. Application Data

(60) Provisional application No. 61/557,260, filed on Nov. 8, 2011.

(51) Int. Cl.
*H04W 88/02* (2009.01)
*H04W 88/08* (2009.01)
(Continued)

(52) U.S. Cl.
CPC ........... *H04W 24/00* (2013.01); *H04L 1/0027* (2013.01); *H04W 72/082* (2013.01);
(Continued)

(58) Field of Classification Search
CPC .... H04B 7/0621; H04B 7/0626; H04B 7/063; H04L 5/0057; H04L 1/0026; H04W 72/082
(Continued)

(56) References Cited

U.S. PATENT DOCUMENTS 8,743,791 B2\* 6/2014 Nam et al. .................... 370/328
9,106,386 B2\* 8/2015 Etemad ................. H04W 24/04
(Continued)

FOREIGN PATENT DOCUMENTS

JP         2013524602 A    6/2013
WO   WO-2011130447 A1   10/2011
WO        2012028204 A1    3/2012

OTHER PUBLICATIONS

3GPP TSG RAN WG1 #66bis, UL Control Channel Enhancements for CA Operation, QUALCOMM, Oct. 10-13, 2011.\*
(Continued)

*Primary Examiner* — Ayaz Sheikh
*Assistant Examiner* — Debebe Asefa
(74) *Attorney, Agent, or Firm* — Norton Rose Fulbright US LLP

(57) ABSTRACT

Collision handling of channel state information (CSI) reports is described for enhanced inter-cell interference coordination (eICIC), coordinated multipoint transmission (CoMP), and/or carrier aggregation (CA). Various aspects include prioritization schemes to resolve collisions between different CSI reporting sets in relation to the same component carrier (CC) used with transmission. Multiple stages of prioritization may identify CSI for a report based on various criteria. Tie breaker criteria may be defined for priority among CSI reports that changes for different subframes. In other aspects, PUSCH is utilized to transmit CSI for prioritized reporting sets in a subframe. In yet other aspects, if parallel PUCCH is supported, colliding CSI may be handled on a per PUCCH basis. Other aspects may allow for prioritizing periodic CSI within each of multiple CCs, and then prioritizing over different CCs to handle an interaction of CSI reports for CA, eICIC and/or CoMP.

65 Claims, 10 Drawing Sheets

(51) Int. Cl.
*H04L 1/00* (2006.01)
*H04W 24/00* (2009.01)
*H04W 72/12* (2009.01)
*H04W 72/08* (2009.01)

(52) U.S. Cl.
CPC ....... *H04L 1/0026* (2013.01); *H04W 72/1247* (2013.01); *H04W 88/02* (2013.01); *H04W 88/08* (2013.01)

(58) Field of Classification Search
USPC .......................... 370/254–350; 709/201–213
See application file for complete search history.

(56) References Cited

U.S. PATENT DOCUMENTS

| | | | |
|---|---|---|---|
| 9,277,471 | B2* | 3/2016 | He ........................ H04W 28/24 |
| 2011/0142144 | A1 | 6/2011 | Allpress et al. |
| 2012/0140708 | A1 | 6/2012 | Choudhury et al. |
| 2012/0207047 | A1 | 8/2012 | Liao et al. |
| 2012/0220286 | A1 | 8/2012 | Chen et al. |
| 2013/0242920 | A1* | 9/2013 | Wang et al. ................. 370/329 |

OTHER PUBLICATIONS

3GPP TSG RAN WG1 #66 bis, On Periodic CSI Report for Carrier Aggregation, Alcatel-Lucent, Oct. 10-14, 2011.*
3GPP TSG WG2 #73, HT mMobile, Priority setting for period CQI/PMI/RI reporting in CA, Feb. 21-24, 2011.*
3GPP TSG RAN WG1 #70, CSI Collision Handling for ComP—R1-123468.*
3GPP TSG RAN WG1 #66 bis, UL Control Cannel enhancements for CA operation—R1-113377.*
3GPP TSG WG1 #66bis Enhacement for CSI transmission in LTE-A Rel-11 with CA—R1-112938.*
3GPP TSG WG2 #73, QUALCOMM, Tie-Breaking for periodic CQI/PMI/RI reporting priority , Jan. 17-21, 2011.*
Mediatek Inc: "Collision Handling for Periodic CSI Reporting in Subframe Subsets", 3GPP Draft; R1-110142 Collision Handling for Periodic CSI Reporting, 3rd Generation Partnership Project (3GPP), Mobile Competence Centre ; 650, Route Des Lucioles ; F-06921 Sophia-Antipolis Cedex ; France, vol. RAN WG1, No. Dublin, Ireland; 20110117, Jan. 12, 2011 (Jan. 12, 2011), 3 Pages, XP050490315, [retrieved on Jan. 12, 2011].
Samsung: "CSI Feedback Signaling in Rel.10", 3GPP TSG-RAN WG1#60 R1-101147, Feb. 16, 2010, pp. 1-3.
"3rd-Generation Partnership Project; Techincal Specification Group Radio Access Network; Evolved Universal Terrestrial Radio Access (E-UTRA); Physical Layer Procedures (Release 10)", 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN. WG1, No. V10.2.0, Jun. 22, 2011 (Jun. 22, 2011), pp. 1-120, XP050553381.
Alcatel-Lucent et al: "On Periodic CSI Report for Carrier Aggregation", 3GPP Draft; R1-113310 Periodic CSI Report, 3rd Generation Partnership Project (3GPP), Mobile Competence Centre; 650, Route Des Lucioles; F-06921 Sophia-Antipolis Cedex; France, vol. RAN WG1, No. Zhuhai; 20111010, Oct. 4, 2011 (Oct. 4, 2011), XP050538401.
Catt: "Enhancement for CSI transmission in LTE-A Rel-11 with CA", 3GPP Draft; R1-112938, 3rd Generation Partnership Project (3GPP), Mobile Competence Centre; 650, Route Des Lucioles; F-06921 Sophia-Antipolis Cedex; France, vol. RAN WG1, No. Zhuhai; 20111010, Oct. 4, 2011 Oct. 4, 2011), XP050538144.
Han, "CSI Collision Handling for CoMP", 3GPP TSG RAN WG1 #70 R1-123468, Samsung, 2012, 3 pgs.
HT Mmobile Inc: "Priority setting for periodic CQI/PMI/RI reporting in CA", 3GPP Draft; R2111324, 3rd Generation Partnership Project (3GPP), Mobile Competence Centre; 650, Route Des Lucioles ; F-06921 Sophia-Antipolis Cedex; France, vol. RAN WG2, No. Taipei, Taiwan; 20110221, Feb. 15, 2011 (Feb. 15, 2011), XP050493780.
Interdigital Communications et al: "Periodic CSI Reporting", 3GPP Draft; R1-110190 Periodic CSI, 3rd Generation Partnership Project (3GPP), Mobile Competence Centre; 650, Route Des Lucioles; F-06921 Sophia-Antipolis Cedex; France, vol. RAN WG1, No. Dublin, Ireland; 20110117, Jan. 11, 2011 (Jan. 11, 2011), XP050490116.
International Search Report and Written Opinion—PCT/US2012/064085—ISA/EPO—Jun. 12, 2013.
Partial International Search Report—PCT/US2012/064085—ISA/EPO—Apr. 15, 2015.
QUALCOMM Incorporated: "Tie-breaking for Periodic CQI/PMI/RI Reporting Priority", 3GPP Draft; R2-111037, 3rd Generation Partnership Project (3GPP), Mobile Competence Centre; 650, Route Des Lucioles; F-06921 Sophia-Antiplois Cedex; France, vol. RAN WG2, No. Taipei, Taiwan; 20110221, Feb. 15, 2011 (Feb. 15, 2011), XP050493678.
QUALCOMM Incorporated: "UL control channel enhancements for CA operation", 3GPP Draft; R1-113377 UL Control Channel Enhancements for CA Operation, 3rd Generation Partnership Project (3GPP), Mobile Competence Centre; 650, Route Des Lucioles; F-06921 Sophia-Antipolis Cedex ; France, vol. RAN WG1, No. Zhuhai; 20111010, Oct. 4, 2011 (Oct. 4, 2011), XP050538433.
Samsung: "Multi-Cell Periodic CSI Reporting for DL CA", 3GPP Draft; R1-110376 Multi Cell CSI, 3rd Generation Partnership Project (3GPP), Mobile Competence Centre; 650, Route Des Lucioles; F-06921 Sophia-Antiplois Cedex; France, vol. RAN WG1, No. Zhuhai; 20111010, Oct. 4, 2011 (Oct. 4, 2011), XP050538224.

* cited by examiner

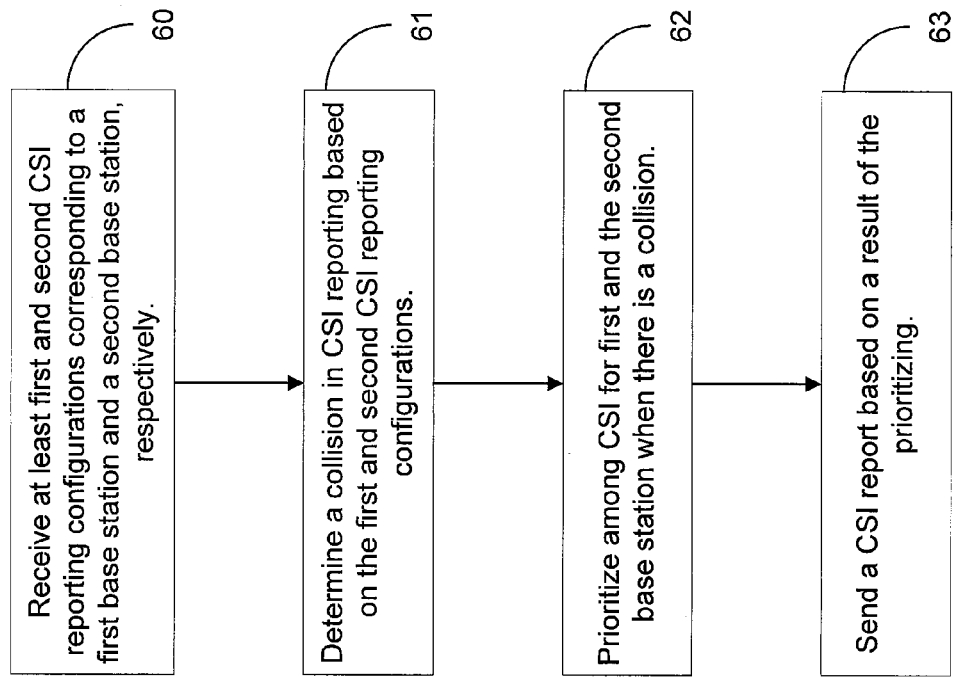

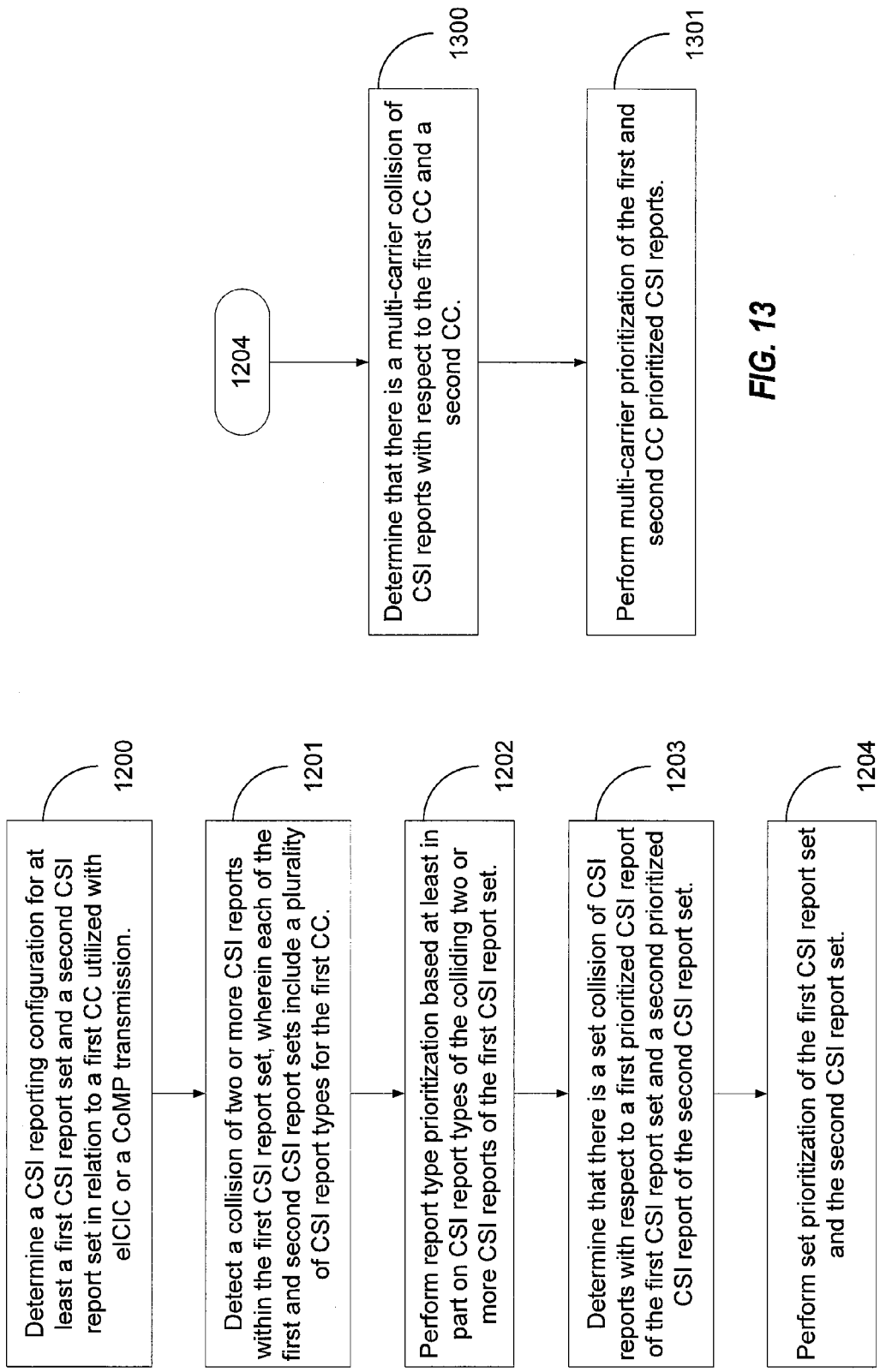

USER EQUIPMENT, BASE STATIONS, AND METHODS ALLOWING FOR HANDLING OF COLLIDING CHANNEL STATE INFORMATION REPORTS

RELATED APPLICATIONS

The present application for patent claims priority to Provisional Application No. 61/557,260, entitled "USER EQUIPMENT, BASE STATIONS, AND METHODS ALLOWING FOR HANDLING OF COLLIDING CHANNEL STATE INFORMATION REPORTS" filed Nov. 8, 2011, and assigned to the assignee hereof and hereby expressly incorporated by reference herein for all purposes.

FIELD

Aspects of the present disclosure relate generally to the field of wireless communication systems.

BACKGROUND

Wireless communication networks are widely deployed to provide various communication services such as voice, video, packet data, messaging, and the like. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile terminals, which are also called user equipment (UE). A UE may communicate with a base station via a downlink and an uplink. The downlink (or forward link) refers to the communication link from the base station to the UE, and the uplink (or reverse link) refers to the communication link from the UE to the base station. A base station may transmit data and control information on the downlink to a UE and may receive data and control information on the uplink from the UE.

SUMMARY

User equipment, base stations, and methods allow for handling colliding channel state information (CSI) reports with enhanced inter-cell interference coordination (eICIC), coordinated multipoint transmission (CoMP), and/or carrier aggregation (CA). In one aspect, a dynamic prioritization scheme is utilized in which a tie breaker criteria for priority among CSI reports changes for different subframes. In another aspect, physical uplink control channel (PUCCH) format 3 is utilized to transmit two or more sets of CSI reports in one subframe. In yet another aspect, a physical uplink shared channel (PUSCH) is utilized to transmit one or more additional sets of CSI reports in a subframe. In yet another aspect, if parallel PUCCH is supported, the handling of colliding CSI is done on a per PUCCH basis. Another aspect allows for prioritizing periodic CSI within each component carrier (CC) of two or more CC, and then prioritizing over different CC to handle an interaction of CSI reports for carrier aggregation and eICIC and/or CoMP.

Representative aspects of the present disclosure are directed to a method for a UE in a wireless network that utilizes at least one of eICIC or CoMP transmission. The method includes determining a CSI reporting configuration for at least a first CSI report set and a second CSI report set in relation to a first CC utilized with the eICIC or the CoMP transmission, detecting a collision of two or more CSI reports within the first CSI report set, wherein each of the first CSI report set and the second CSI report set include a plurality of CSI report types for the first CC, performing report type prioritization based at least in part on CSI report types of the colliding two or more CSI reports of the first CSI report set, determining that there is a set collision of CSI reports with respect to a first prioritized CSI report of the first CSI report set and a second prioritized CSI report of the second CSI report set, and performing set prioritization of the first CSI report set and the second CSI report set.

Further representative aspects of the present disclosure are directed to an apparatus for a UE in a wireless network that utilizes at least one of eICIC or CoMP transmission, that includes means for determining a CSI reporting configuration for at least a first CSI report set and a second CSI report set in relation to a first CC utilized with the eICIC or the CoMP transmission, means for detecting a collision of two or more CSI reports within the first CSI report set, wherein each of the first CSI report set and the second CSI report set include a plurality of CSI report types for the first CC, means for performing report type prioritization based at least in part on CSI report types of the colliding two or more CSI reports of the first CSI report set, means for determining that there is a set collision of CSI reports with respect to a first prioritized CSI report of the first CSI report set and a second prioritized CSI report of the second CSI report set, and means for performing set prioritization of the first CSI report set and the second CSI report set.

Further representative aspects of the present disclosure are directed to an apparatus that includes at least one processor and a memory coupled to the processor. The processor is configured to determine a CSI reporting configuration for at least a first CSI report set and a second CSI report set in relation to a first CC utilized with the eICIC or the CoMP transmission, detect a collision of two or more CSI reports within the first CSI report set, wherein each of the first CSI report set and the second CSI report set include a plurality of CSI report types for the first CC, perform report type prioritization based at least in part on CSI report types of the colliding two or more CSI reports of the first CSI report set, determine that there is a set collision of CSI reports with respect to a first prioritized CSI report of the first CSI report set and a second prioritized CSI report of the second CSI report set, and perform set prioritization of the first CSI report set and the second CSI report set.

Further representative aspects of the present disclosure are directed to a non-transitory computer-readable storage medium that includes code for causing a computer to determine a CSI reporting configuration for at least a first CSI report set and a second CSI report set in relation to a first CC utilized with the eICIC or the CoMP transmission, detect a collision of two or more CSI reports within the first CSI report set, wherein each of the first CSI report set and the second CSI report set include a plurality of CSI report types for the first CC, perform report type prioritization based at least in part on CSI report types of the colliding two or more CSI reports of the first CSI report set, determine that there is a set collision of CSI reports with respect to a first prioritized CSI report of the first CSI report set and a second prioritized CSI report of the second CSI report set, and perform set prioritization of the first CSI report set and the second CSI report set.

BRIEF DESCRIPTION OF THE DRAWINGS

FIG. 10 is a flowchart of a method in accordance with an aspect; and

FIG. 11 is a flowchart of a method in accordance with an aspect.

FIG. 12 is a functional block diagram illustrating example blocks executed to implement one aspect of the present disclosure.

FIG. 13 is a functional block diagram illustrating example blocks executed to implement one aspect of the present disclosure.

DETAILED DESCRIPTION

Figure 1:
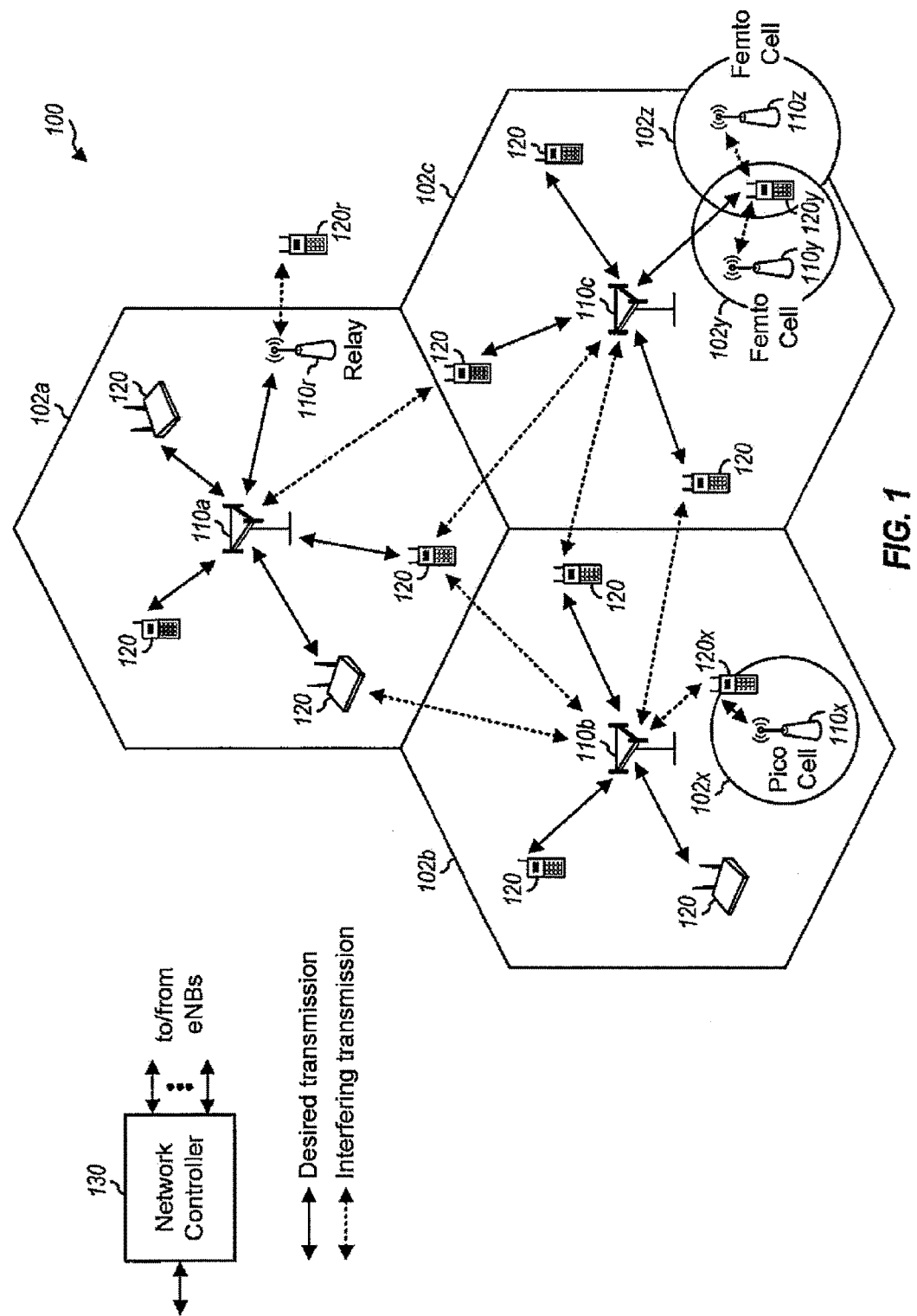
FIG. 1 illustrates a wireless network in accordance with an aspect.

FIG. 1 shows a wireless network 100, which may be a Long Term Evolution Advanced (LTE-A) network, or the like. The wireless network 100 includes a number of evolved node Bs (eNodeBs) 110a, 110b, 110c, 110x, 110y, 110z and other network entities. An eNodeB may be a station that communicates with User Equipments (UEs) 120, 120r, 120x, 120y, and may also be referred to as a base station, a node B, an access point, or the like. Each eNodeB 110a, 110b, 110c, 110x, 110y, 110z may provide communication coverage for a corresponding particular geographic area 102a, 102b, 102c, 102x, 102y, 102z. In the 3rd Generation Partnership Project (3GPP), the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cells. A macro cell generally covers a relatively large geographic area (e.g., several kilometers in radius) and may allow unrestricted access by UEs with service subscriptions with a network provider. A pico cell would generally cover a relatively smaller geographic area and may allow unrestricted access by UEs with service subscriptions with the network provider. A femto cell would also generally cover a relatively small geographic area (e.g., a home or building) and, in addition to unrestricted access, may also provide restricted access by UEs having an association with the femto cell (e.g., UEs in a closed subscriber group (CSG), UEs for users in a home, or the like).

An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b, and 110c are macro eNodeBs for the macro cells 102a, 102b, and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, or the like) cells.

The wireless network 100 may also include relay stations, such as a relay station 110r. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, the relay station 110r may communicate with the eNodeB 110a and the UE 120r in order to facilitate communication between the eNodeB 110a and the UE 120r. A relay station may also be referred to as a relay, a relay eNodeB, or the like.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs, and relays may have a lower transmit power level (e.g., 1 Watt).

The wireless network 100 is able to support synchronous operation, where the eNodeBs have similar frame timing, and transmissions from different eNodeBs may be approximately aligned in time. In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs, such as the eNodeBs 110a, 110b, 110c, 110x, 110y, 110z, and provide coordination and control for these eNodeBs. The network controller 130 may communicate with the eNodeBs 110a, 110b, 110c, 110x, 110y, 110z via a backhaul. The eNodeBs 110a, 110b, 110c, 110x, 110y, 110z may also communicate with one another, e.g., directly or indirectly via a wireless backhaul or a wireline backhaul.

The UEs 120, 120r, 120x, 120y are dispersed throughout the wireless network 100, and each UE 120, 120r, 120x, 120y may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like.

Figure 2:
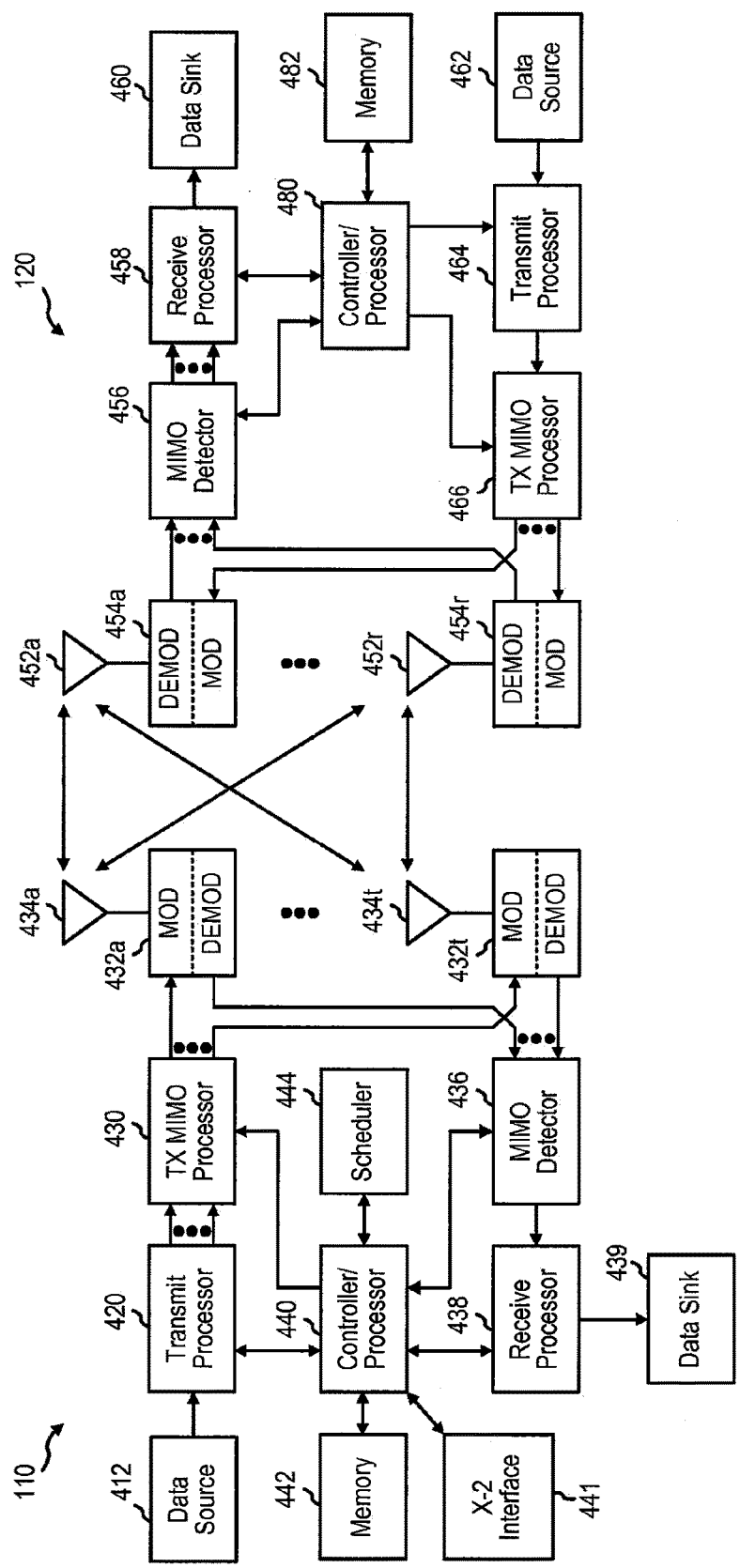
FIG. 2 illustrates a base station in communication with a user equipment in accordance with an aspect.

FIG. 2 shows a block diagram of a design of a base station/eNodeB 110 and a UE 120, which may be one of the base stations/eNodeBs and one of the UEs in FIG. 1. For example, the base station 110 in FIG. 2 may be the macro eNodeB 110c in FIG. 1, and the UE 120 in FIG. 2 may be the UE 120y in FIG. 1. The base station 110 may also be a base station of some other type. As illustrated, base station 110 and UE 120 each include various components which provide exemplary, non-limiting means for performing the operations described herein. In particular, base station 110 and UE 120 can be utilized to implement the respective algorithms set forth below in FIG. 6-FIG. 13.

The base station 110 may be equipped with antennas 434*a* through 434*t*, and the UE 120 may be equipped with antennas 452*a* through 452*r*. At the base station 110, a transmit processor 420 may receive data from a data source 412 and control information from a controller/processor 440. The transmit processor 420 may process (e.g., encode and symbol map) the data and control information to obtain data symbols and control symbols, respectively. The transmit processor 420 may also generate reference symbols. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432*a* through 432*t* may process a respective output symbol stream to provide an output sample stream. Each modulator 432*a* through 432*t* may further process (e.g., convert to analog, amplify, filter, and/or upconvert) the output sample stream to provide a downlink signal. Downlink signals from modulators 432*a* through 432*t* may be transmitted via the antennas 434*a* through 434*t*, respectively.

At the UE 120, antennas 452*a* through 452*r* may receive the downlink signals from the base station 110 and may provide received signals to the demodulators (DEMODs) 454*a* through 454*r*, respectively. Each demodulator 454*a* through 454*r* may condition (e.g., filter, amplify, downconvert, and/or digitize) a respective received signal to obtain input samples. Each demodulator 454*a* through 454*r* may further process the input samples to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and/or decode) the detected symbols, provide decoded data for the UE 120 to a data sink 460, and provide decoded control information to a controller/processor 480.

On the uplink, at the UE 120, a transmit processor 464 may receive and process data from a data source 462 and control information from the controller/processor 480 to obtain data symbols and control symbols, respectively. The transmit processor 464 may also generate reference symbols for a reference signal. The symbols from the transmit processor 464 may be precoded by a TX MIMO processor 466 if applicable, further processed by the modulators 454*a* through 454*r*, and transmitted to the base station 110.

At the base station 110, the uplink signals from the UE 120 may be received by the antennas 434*a* through 434*t*, processed by the demodulators 432*a* through 432*t*, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440. The base station 110 can send messages to other base stations, for example, over an X-2 interface 441.

The controllers/processors 440 and 480 may direct the operation at the base station 110 and the UE 120, respectively. The controller/processor 440 and/or other processors and modules at the base station 110 may perform or direct the execution of various processes for techniques described herein. The controller/processor 480 and/or other processors and modules at the UE 120 may also perform or direct the execution of various processes for the techniques described herein. The memories 442 and 482 may store data and program codes for the base station 110 and the UE 120, respectively. A scheduler 444 may schedule UEs for data transmission on the downlink and/or uplink.

The base station 110 can select from among different modulation schemes and different code rates to be used for data transmissions from the base station 110 to the UE 120. For example, in various aspects, the base station 110 is able to select among various modulation schemes, such as Quadrature Phase-Shift Keying (QPSK), 16-Quadrature Amplitude Modulation (16QAM), and 64QAM, for the transmission of data. For a given modulation scheme, a code rate can also be selected by the base station 110, such as, for example, code rates in a range of 0.076 to 0.93.

The base station 110 can perform link adaptation to select a modulation scheme and a code rate based on downlink channel conditions. The quality of a signal received by the UE 120 from the base station 110 depends on channel quality from the base station 110, a level of interference from other base stations, an a noise level. The base station 110 can use link adaptation to change the modulation scheme for data transmission based on the channel conditions. A low order modulation scheme, such as QPSK, is more robust and can tolerate high levels of interference, but has a lower transmission bit rate compared to higher order modulation schemes. A high order modulation scheme with more bits per modulated symbol, such as 64QAM, allows for a higher bit rate, but is more sensitive to interference and noise as compared with lower order modulation schemes.

The base station 110 can also use link adaptation to change a code rate for a give modulation scheme for data transmission based on radio link conditions. For example, a lower code rate could be used when there are poor channel conditions, and a higher code rate could be used when a Signal-to-Interference-plus-Noise Ratio (SINR) exceeds a specified threshold indicating good channel conditions.

In order to determine the downlink channel conditions to select the proper modulation scheme and code rate, the base station 110 receives feedback sent from the UE 120. In various aspects, the UE 120 performs measurements on downlink reference signals and then provides feedback to the base station 110 in the form of a Channel Quality Indicator (CQI), which provides an indication of a data rate that can be supported by the channel after taking into account the current SINR and various characteristics of the UE 120. In response to the CQI feedback from the UE 120, the base station 110 can select a modulation scheme and a code rate appropriate for the channel conditions.

In various aspects, the base station 110 maintains a table where each row in the table has an index number and a corresponding modulation scheme and code rate. In such aspects, the CQI reported by the UE 120 may specify an index number for the table to indicate a desired modulation scheme and code rate. For example, the UE 120 can report the highest modulation and coding scheme that it can decode with a Block Error Rate (BLER) probability not exceeding 10% based on the measured channel conditions. The report from the UE 120 can be in the form of a CQI report that specifies the desired modulation and coding scheme.

In addition to link adaptation, another technique that can be employed by the base station 110 is to perform spatial multiplexing by using multiple antennas. For example, the base station 110 has multiple antennas 434*a* through 434*t*, and the UE 120 has multiple antennas 452*a* through 452*r*, so those antennas could be used for spatial multiplexing. With spatial multiplexing, two or more blocks of information bits are encoded and modulated separately and the resulting two or more symbol streams are transmitted from different antennas. The number of simultaneously transmitted streams a channel can support depends on the channel characteristics and is referred to as the channel rank.

The UE 120 can be configured to report the channel rank by measuring the channel characteristics and then sending as feedback a Rank Indicator (RI) to the base station 110 that is calculated to maximize capacity over the channel bandwidth. The channel rank specified in the RI from the UE 120 indicates a number of simultaneous streams the channel can support. The base station 110 can then transmit a number of streams up to the number specified in the RI, and the actually transmitted number of streams is called the transmission rank.

Another technique used by the base station 110 for multiple antenna wireless communication is precoding. With precoding, the multiple data streams are emitted from the antennas with weightings such that a link throughput is maximized. Different precoders can be selected that have different weightings. The available precoders to be selected may be specified in a codebook. The most suitable precoder to be selected depends on the current channel conditions, which are known by the UE 120. For example, the UE 120 could determine the transfer functions of the channels from the different antenna ports by making measurements on reference signals from the base station 110, and could then determine which precoder is most appropriate for the channel conditions. The UE 120 may also know the available precoding matrices as defined in the codebook, and can send a Precoding Matrix Indicator (PMI) as feedback to the base station 110 to indicate a particular precoder determined by the UE 120 to be preferred for the current channel conditions. The base station 110 may then take into account the precoder specified by the UE 120 in the PMI when selecting a precoder to be used for transmission.

The reporting of CQI, PMI, and RI from the UE 120 to the base station 110 are examples of Channel State Information (CSI) reports. The CQI, PMI, and RI are each types of CSI, which are feedback indicators indicative of channel conditions. A trade-off exists between an uplink overhead encountered due to an amount of CSI information reported and an accuracy with which the base station 110 can account for current conditions. If CSI is reported frequently by the UE 120 to the base station 110, then the base station 110 can better adjust to the channel conditions. On the other hand, frequent reporting of CSI creates greater overhead in the uplink, since more of the uplink would need to be devoted to reporting CSI.

In some aspects, the base station 110 can configure the rate at which CSI is reported by the UE 120. For example, the base station 110 can request that the UE 120 send CSI reports at periodic intervals and the period may be selected by the base station 110 from among possible periods such as 2 ms, 5 ms, 10 ms, 16 ms, 20 ms, 32 ms, 40 ms, 64 ms, 80 ms, 128 ms, 160 ms, or the like. Such CSI reports are termed periodic CSI reports. A collision of reports may occur when multiple CSI reporting instances overlap for types, sets, CCs, and the like. For example, CSI reports that are scheduled every 20 ms and 80 ms may collide every fourth reporting interval, based on the periodicity of the report. Thus, it may be necessary to drop one or more CSI reports, in the event of such collisions. To further explain the reporting of CSI, it is instructive to consider an example of a format for communication between the base station 110 and the UE 120.

Figure 3:
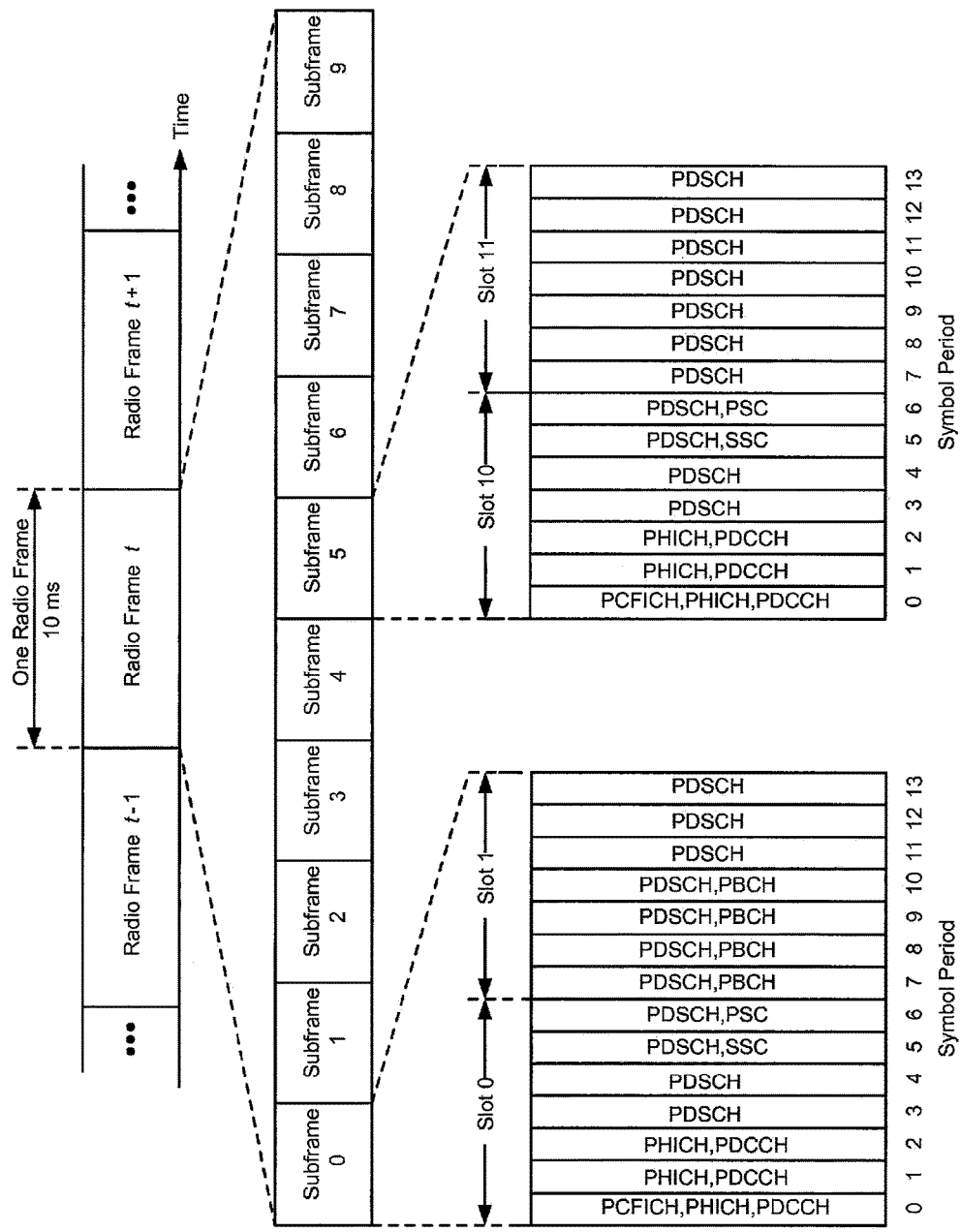
FIG. 3 illustrates an example of a downlink communication format in accordance with an aspect.

FIG. 3 shows an example of a downlink FDD frame structure. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

A base station may send a primary synchronization signal (PSC or PSS) and a secondary synchronization signal (SSC or SSS) for each cell served by the base station. For FDD mode of operation, the primary and secondary synchronization signals may be sent in symbol periods 6 and 5, respectively, in each of subframes 0 and 5 of each radio frame with the normal cyclic prefix, as shown in FIG. 3. The synchronization signals may be used by UEs for cell detection and acquisition. For FDD mode of operation, the base station may send a Physical Broadcast Channel (PBCH) in symbol periods 0 to 3 in slot 1 of subframe 0. The PBCH may carry certain system information.

The base station may send a Physical Control Format Indicator Channel (PCFICH) in the first symbol period of each subframe, as seen in FIG. 3. The PCFICH may convey a number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 3, M=3. The base station may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support hybrid automatic retransmission (HARQ). The PDCCH may carry information on uplink and downlink resource allocation for UEs and power control information for uplink channels. The base station may send a Physical Downlink Shared Channel (PDSCH) in the remaining symbol periods of each subframe. The PDSCH may carry data for UEs scheduled for data transmission on the downlink.

Figure 4:
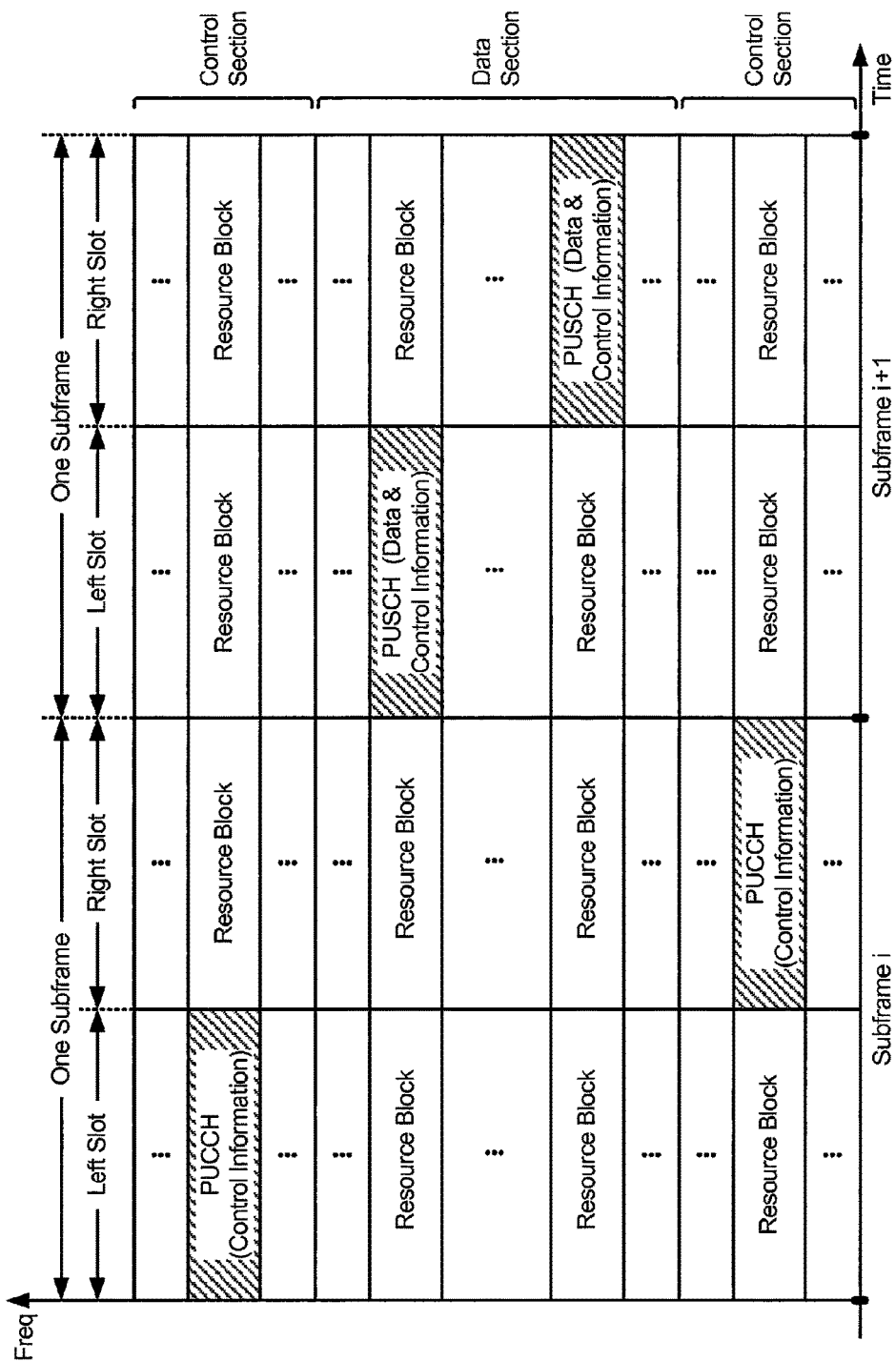
FIG. 4 illustrates an example of an uplink communication format in accordance with an aspect.

FIG. 4 is a block diagram illustrating an exemplary FDD and TDD subframe structure for uplink communications. Similar to the downlink format, the uplink format is also separated into subframes. Available resource blocks (RBs) for the uplink may be partitioned into a data section and a control section. The resource blocks in the control section may be assigned to UEs for transmission of control information. The data section may include all resource blocks not included in the control section.

A UE may be assigned resource blocks in the control section to transmit control information to a base station. The UE may also be assigned resource blocks in the data section to transmit data to the base station. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency.

Various aspects of the present disclosure relate to enhanced inter-cell interference coordination (eICIC).

A UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the femto eNodeB 110y. However, the UE 120y may not be able to access the femto eNodeB 110y due to restricted association and may instead connect to the macro eNodeB 110c with lower received power (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink.

When operating in a connected mode, the UE 120y may experience so much interference in this dominant interference scenario that it may no longer be able to maintain an acceptable connection with the macro eNodeB 110c, for example. The analysis of interference for the UE 120y includes obtaining the signal quality, such as by calculating the error rate of the PDCCH received on the downlink from the macro eNodeB 110c. Alternatively, the error rate of the PDCCH may be predicted based on a signal-to-noise ratio (SNR) of the PDCCH. If the error rate of the PDCCH, as calculated by the UE 120y, reaches a predefined level, the UE 120y will declare a radio link failure (RLF) to the macro eNodeB 110c and end the connection. At this point, the UE 120y may attempt to reconnect to the macro eNodeB 110c or possibly attempt to connect to another eNodeB with a stronger signal.

A dominant interference scenario may also occur due to range extension. Range extension occurs when a UE connects to an eNodeB with lower path loss and lower SNR among all eNodeBs detected by the UE. For example, in FIG. 1, the UE 120x may detect the macro eNodeB 110b and the pico eNodeB 110x. Further, the UE 120x may have lower received power for the pico eNodeB 110x than the macro eNodeB 110b. The UE 120x may connect to the pico eNodeB 110x if the path loss for the pico eNodeB 110x is lower than the path loss for the macro eNodeB 110b. This may result in less interference to the wireless network for a given data rate for the UE 120x.

In a range extension enabled wireless network, enhanced inter-cell interference coordination (eICIC) may enable the UEs to obtain service from a lower power base station (e.g., a pico base station, femto base station, relay, etc.) in the presence of a macro base station with strong downlink signal strength, and/or to enable the UEs to obtain service from a macro base station in the presence of a strongly interfering signal from a base station to which the UE is not authorized to connect. The eICIC may be used to coordinate resources such that the interfering base station may relinquish some resources and enable control and data transmissions between the UE and the serving base station. When a network supports eICIC, the base stations negotiate and coordinate the use of resources to reduce and/or eliminate interference from the interfering cell relinquishing part of its resources. Accordingly, a UE can access the serving cell even with severe interference by using the resources yielded by the interfering cell.

For example, a coverage lapse within a macro cell may exist when a femto cell with a closed access mode, in which only member femto UEs may access the cell, lies within the coverage area of the macro cell. By making this femto cell give up some of its resources, the UE within the femto cell coverage area may access its serving macro cell by using the resources yielded by the femto cell. In a radio access system using OFDM, these yielded resources may be time-based, frequency-based, or a combination of both. When the yielded resources are time-based, the interfering cell refrains from using some of its accessible subframes in the time domain. When these resources are frequency-based, the interfering cell does not use some of its accessible subcarriers in the frequency domain. When the yielded resources are a combination of both frequency and time, the interfering cell does not use the resources defined by frequency and time.

In time domain eICIC, subframe utilization across different cells is coordinated in time through backhaul signaling or Operations and Management (OAM) configuration of Almost Blank Subframe (ABS) patterns. ABSs are subframes with reduced transmit power (including no transmission) on some physical channels and/or reduced activity.

For eICIC, two sets of CSI measurement subframes can be configured for a UE. The CSI can be configured via parameter csi-SubframePatternConfig-r10, which contains two subframe sets: (i) $C_{CSI,0}$: csi-MeasSubframeSet1-r10; and (ii) $C_{CSI,1}$: csi-MeasSubframeSet2-r10. In various aspects, $C_{CSI,0}$ and $C_{CSI,1}$ are not expected to overlap. Also, in various aspects, each CSI reference resource belongs to either set, but not to both. Further, an eNodeB can configure either 1 or 2 sets of periodic reporting parameters, such as (i) Set 1: cqi-pmi-ConfigIndex (periodicity/offset of CQI/PMI) and ri-ConfigIndex (periodicity/offset of RI); and (ii) Set 2: cqi-pmi-ConfigIndex2 and ri-ConfigIndex2.

In eICIC there could be a collision, for example, if there is an overlapped set 1 and set 2. When both sets of restricted measurement subframes are configured, CSI reporting instances of CSI configuration set 1 could collide with CSI reporting instances of CSI configuration set 2. In various aspects, when eICIC is used, there are two types of subframes where interference seen by a UE will be different, because in some subframes a base station may be transmitting with reduced transmit power or not transmitting at all to reduce interference, while in other subframes the base station may be transmitting at full power and causing interference. In various aspects, the UE obtains two different CSI measurements for those two different conditions in which one measures conditions where there is less interference and one measures conditions where there is more interference. The CSI reports for those two different conditions may collide if they are to be transmitted in a same subframe based on their periodicity/offset.

In addition to eICIC, another technique that may be employed in various systems is coordinated multipoint transmission (CoMP).

With reference again to FIG. 1, wireless network 100 can support a coordinated data transmission or a non-coordinated data transmission to UEs 120 on the downlink. For a coordinated transmission (also referred to herein as a "coordinated multipoint (CoMP) transmission), multiple cells may coordinate to transmit data to one or more target UEs on the same time-frequency resource such that signals from the multiple cells can be combined at a target UE and/or inter-cell interference can be reduced at the target UE. As used herein, the following transmission modes may be provided by one or more eNBs in a coordinated transmission:

1. Joint processing—multi-point transmission of data from multiple cells to one or more UEs with precoding vectors at different cells being selected to achieve beamforming gain at a target UE and/or interference reduction at one or more interfered UEs, 2. Coordinated beamforming—single-point transmission of data from a single cell to a target UE with one or more precoding vectors selected for the cell by trading between beamforming gain to the target UE and interference reduction to one or more interfered UEs served by one or more neighbor cells, and 3. Coordinated silencing—transmission of data from one or more cells to a target UE on a given time-frequency resource, with one or more other cells not transmitting on the time-frequency resource to avoid causing interference to the target UE.

CoMP may include other transmission modes not listed above. Each CoMP transmission mode may involve multiple cells, which may include at least one cell transmitting data to the UE and possibly at least one other cell acting to reduce interference to the UE.

Multiple cells may transmit data to a given UE for joint processing whereas a single cell may transmit data to the UE in a coordinated beamforming. However, for both joint processing and coordinated beamforming, the precoding vector(s) used by one or more cells to transmit data to the UE may be selected by considering the channels of the UE as well as the channels of other UE(s) in order to reduce inter-cell interference. For example, a neighbor cell may transmit data to one of its UEs based on a precoding vector that is selected according to the channel of the given UE to reduce interference. For each CoMP transmission mode, a designated entity (e.g., a serving cell 110*a*, a network controller 130, etc.) may facilitate the coordinated transmission by determining which cells participate (e.g., a "CoMP set" for the UE) and sending data for the UE and/or other information (e.g., scheduling information, channel state information, precoding information, etc.) to all participating cells.

Figure 5:
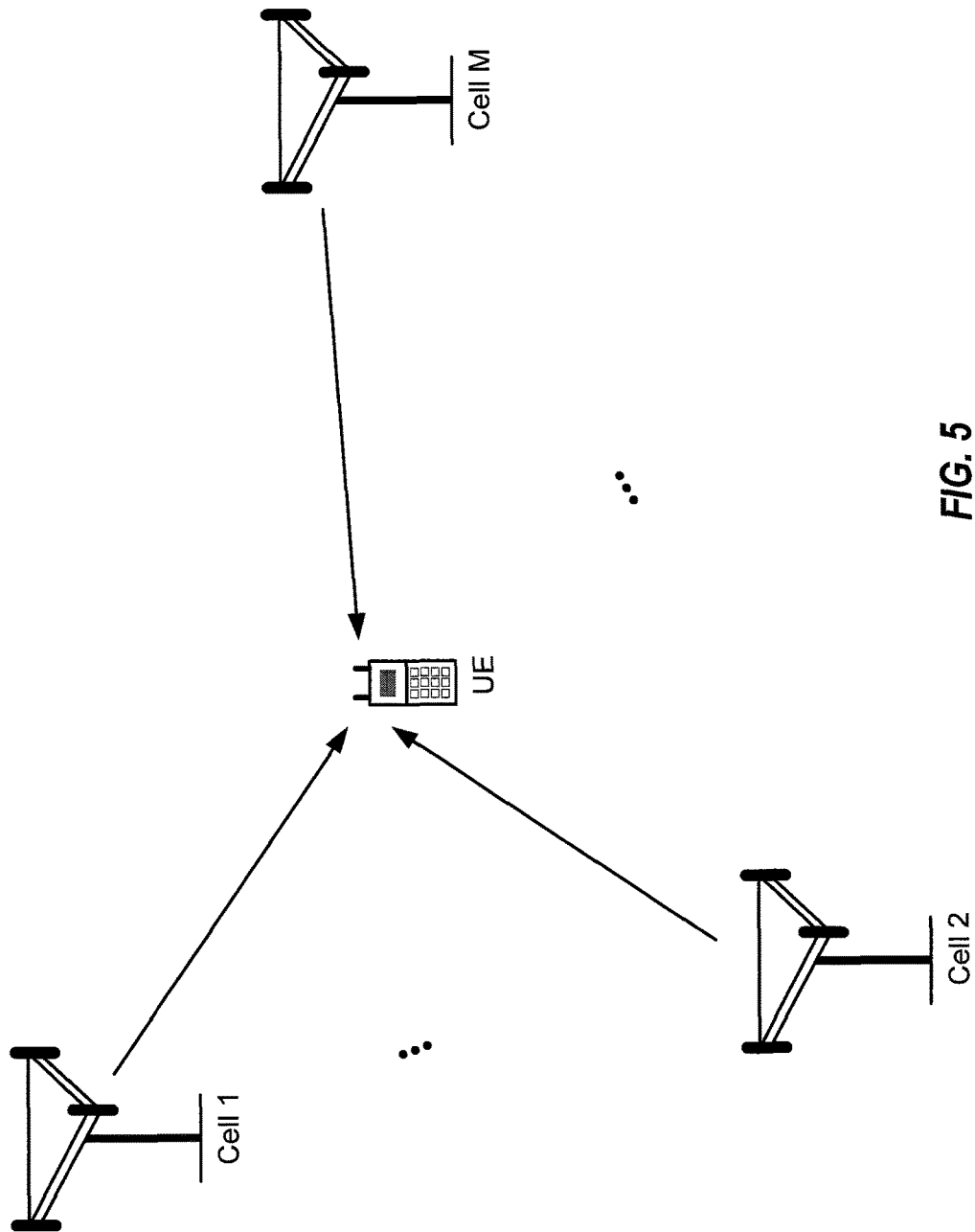
FIG. 5 illustrates an example of coordinated transmission from multiple cells to user equipment in accordance with an aspect.

FIG. 5 shows an example of CoMP transmission from multiple cells to a single UE. The UE may have a measurement set, which may include all cells that can participate in CoMP transmission. These cells may belong to the same eNodeB or different eNodeBs and may be selected based on channel gain/path-loss, received signal strength, received signal quality, etc. For example, the measurement set may include cells with channel gain, or received signal strength, or received signal quality above a certain threshold.

The UE may report channel state information (CSI) for the cells in the measurement set. The UE may be served by a plurality of cells in a CoMP set for either multi-point transmission (joint processing) or single-point transmission (coordinated beamforming). As noted previously, the CoMP set may include cell(s) that transmit data to the UE and cell(s) that attempt to reduce interference to the UE. The CoMP set may include all or some of the cells in the measurement set and may be dynamically selected by the wireless network.

In general, the UE may report the CSI and timing information to support CoMP transmission, both in terms of the selection of participating cells and for determining a coordinated transmission mode to the UE. The channel state information may be indicative of the channel responses for different cells, whereas the timing information may be indicative of the receive times at the UE of signals transmitted by the different cells.

The UE may report CSI based on explicit channel feedback (also referred to as "explicit feedback") or implicit channel feedback (also referred to as "implicit feedback"). For explicit feedback, the UE may report CSI indicative of the channel responses for different cells, as observed by the UE, without assuming any transmitter or receiver spatial processing. For example, the CSI for explicit feedback may comprise (i) channel matrices indicative of the channel responses for the cells or (ii) eigenvectors obtained by performing singular value decomposition of the channel matrices. For implicit feedback, the UE may report CSI determined based on the channel responses for different cells and possibly assuming certain transmitter and/or receiver spatial processing. For example, the CSI for implicit feedback may comprise PMI, RI, and/or CQI determined based on the channel responses and received signal qualities for different cells.

Thus, in various examples, CoMP schemes are used to coordinate the transmissions from multiple base stations to one or more UEs. Some examples of CoMP schemes are (i) Joint transmission where multiple eNodeBs transmit the same data meant for a UE by, for example, using a joint precoding vector spanning all the antennas of the eNodeBs; (ii) "distributed Multiple-Input Multiple-Output (MIMO)" where eNodeBs transmit different pieces of data meant for a UE as different MIMO layers where, for example, one layer is sent by one eNodeB and a second layer is sent by a second eNodeB; and (iii) Coordinated beamforming where an eNodeB transmits to a UE using beams that are chosen to reduce interference to UEs in neighboring cells.

CoMP may exist in homogeneous networks and/or heterogeneous networks (HetNet). The connection between eNodeBs involved in CoMP can be X2 (some latency, limited bandwidth) or fiber (less latency and larger bandwidth). In HetNet CoMP, low power eNodeBs may be referred to as Remote Radio Head (RRH).

A UE in CoMP may be configured to provide two or more sets of periodic CSI configurations. For example, the UE may provide a set 1 CSI report for a cell 1 involved in the CoMP, a set 2 CSI report for a cell 2 involved in the CoMP, and so on up to a set M CSI report for a cell M involved in the CoMP.

For time-domain eICIC and for CoMP, where there are two or more sets of periodic CSI report configurations, reporting instances of the two or more sets may collide. In various aspects disclosed herein, the sets of CSI reports are prioritized according to a priority scheme and only one set is reported. In some aspects disclosed herein, two or more sets of CSI reports are reported simultaneously.

In some aspects, a UE is configured to perform a collision handling method if the two configuration sets for eICIC have collision in which there are overlapping CSI reporting instances for set 1 and set 2. In various aspects, the set 1 configuration is cqi-pmi-ConfigIndex (periodicity/offset of CQI/PMI) and ri-ConfigIndex (periodicity/offset of RI), and the set 2 configuration is cqi-pmi-ConfigIndex2 and ri-ConfigIndex2.

When there are two or more sets of periodic CSI report configurations for eICIC or for CoMP and the reporting instances of the two or more sets collide, there are various alternative ways in which the UE handles the collision.

A first collision handling method that can be used for eICIC and for CoMP is to report only one set in any subframe. If there are colliding sets of periodic CSI reports, then the set to be reported in a subframe is determined according to a priority scheme. The priority scheme first prioritizes between sets based on a reporting mode or type of each set. A tie breaker is then used to break ties among sets with a same type, where the tie breaker may pick a predetermined set (e.g., based on a lowest set index), or a set may be selected based on a Radio Resource Control (RRC) configuration.

Carrier aggregation is a further technique that can be used by the base station 110 and the UE 120. In some systems, carrier aggregation is an optional features which may be used in combination with other communication techniques such eICIC and CoMP. With carrier aggregation, the base station 110 and the UE 120 communicate with each other using component carriers (CCs) that may have, for example, up to a 20 MHz bandwidth. Component carriers are also known as cells, which include downlink component carriers and uplink component carriers. In order to support data rates of 1 Gbps, a transmission bandwidth of up to 100 MHz may be required. Carrier aggregation is a technique that allows for aggregating CCs for transmission. For example, five CCs of 20 MHz bandwidth each can be aggregated to achieve a high bandwidth transmission of 100 MHz. The CCs that are aggregated may have same or different bandwidths, may be adjacent or non-adjacent CCs in a same frequency band, and may be CCs in different frequency bands. Thus, in addition to achieving high bandwidth, another motivation for carrier aggregation is to allow for the use of a fragmented spectrum.

In an example where five downlink CCs are aggregated for transmission, CSI feedback would be needed for each of the five downlink CCs. In various aspects, the CSI feedback for all of the aggregated downlink CCs is transmitted from the UE 120 to the base station 110 on a single uplink CC. There is a limited amount of space in each subframe of the uplink for CSI feedback. The base station 110 may specify a different periodicity of reporting CSI for each of the downlink CCs. In various aspects, different periodicities for reporting CSI are configured for each downlink CC to attempt to minimize a situation in which two or more CSI reports for different downlink CCs are competing to be transmitted in an uplink subframe. In such a situation where two or more CSI reports are competing to be transmitted in an uplink subframe, there is a collision of CSI reports.

In some aspects, CSI reports for two or more downlink CCs collide for an uplink subframe due to carrier aggregation, only one CC is reported by the UE 120 while reports for all of the other CCs are dropped. In such aspects, periodic CSI including information such as CQI, PMI, and/or RI, may be limited to only one downlink CC in one uplink subframe. If a collision of CSI reports does occur due to carrier aggregation, the downlink CC for which the CSI report will be transmitted is determined according to a priority scheme. The priority scheme for CSI report collisions due to carrier aggregation prioritizes between CCs based on reporting modes or types of the CSI reports.

The types of CSI reports may be as follows:
Type 1 report: supports CQI feedback for UE selected sub-bands;
Type 1a report: supports sub-band CQI and second PMI feedback;
Type 2, 2b, and 2c reports: support wideband CQI and PMI feedback;
Type 2a report: supports wideband PMI feedback;
Type 3 report: supports RI feedback;
Type 4 report: supports wideband CQI;
Type 5 report: supports RI and wideband PMI feedback; and
Type 6 report: supports RI and Precoder Type Indication (PTI) feedback.

The priority scheme for colliding CSI reports due to carrier aggregation may be as follows: (1) First priority is given to downlink CCs with CSI reports that contain an RI or a wideband first PMI, such as type 3, 5, 6, and 2a reports; (2) Second priority is given to downlink CCs with other wideband CQI and/or PMI reports, such as type 2, 2b, 2c, and 4 reports; and (3) Third priority is given downlink CCs with sub-band CQI/PMI reports, such as type 1 and 1a reports. As a tie breaker for a given subframe, in case of collision between CSI reports of different serving cells with PUCCH reporting type of the same priority, the CSI of the serving cell with a lowest cell index (ServCellIndex) is prioritized. The same priority rule applies to both a case without PUSCH and a case with PUSCH.

After prioritizing the downlink CCs with colliding CSI reports due to carrier aggregation, the CSI report for the downlink CC with the highest priority may be transmitted in the subframe while the CSI reports for the other downlink CCs are dropped. Also, for the downlink CC with the CSI report to be transmitted, the same prioritization procedure is applied in case of a collision between RI, wideband CQI/PMI, and/or sub-band CQI for the same CC.

In the priority scheme for carrier aggregation, the tie breaker for a subframe in a case of collision between CSI reports of different serving cells with a PUCCH reporting type of a same priority is to report the CSI of the serving cell with a lowest cell index. Such a tie breaker may be problematic for eICIC or CoMP sets, because one set would always be favored over another. So, instead of having a tie breaker rule that is static, a tie breaker that is dynamic may be used for breaking ties among colliding sets for eICIC or CoMP. For example, with a dynamic tie breaker, different types of sets may win tie breaks for different subframes. The dynamic tie breaker can change according to a rule for different subframes. In one example, the dynamic tie breaker is signaled from a higher layer and the tie breaker criteria can be specified on a subframe basis. With a dynamic tie breaker, one type of set would not always be favored over another in a tie breaker, since the tie breaking rule would change for different subframes.

The prioritization among sets can be semi-static (similar to CC prioritization as in carrier aggregation) or can be dynamic. Using a dynamic prioritization may allow for improved prioritization among cells geographically non-co-located. A UE uses a dynamic priority scheme to prioritize among colliding sets of CSI reports, where the dynamic nature of the priority scheme changes how different types of sets are prioritized for different subframes. In this way, a dynamic prioritization scheme allows for different types of sets of CSI reports to have different prioritizations for different subframes.

In one example of dynamic prioritization, the eNodeB may signal, via a higher layer, a bitmap indicating priorities among different CSI reports in different subframes. In another example, the eNodeB may signal, via a higher layer, an initial value to a predefined pseudo-random sequence that generates priorities among different CSI reports as a function of a subframe index.

A second collision handling method that can be used for eICIC and for CoMP is to report two or more sets in the colliding subframes. In one example, a UE utilizes a PUCCH format 3 to report two or more sets of CSI in one subframe. PUCCH format 3 is a type of PUCCH format with a larger payload than other PUCCH formats. The larger payload of the PUCCH format 3 can be used by a UE to accommodate two or more reports of CSI in one subframe. Thus, when there is a collision of two or more sets of CSI for a subframe, the two or more sets are reported in the subframe by utilizing the larger payload of PUCCH format 3.

Another way to report two or more sets of CSI in a subframe in accordance with the present disclosure is to have the UE utilize the PUSCH in the uplink to send additional sets. The UE transmits a set of CSI in the PUCCH of a subframe and then transmits one or more additional sets of CSI in the PUSCH of the subframe, so that two or more sets of CSI can be reported in a subframe. In a case of eICIC where there are two sets, one set of CSI could be reported in the PUCCH for a subframe and the other set of CSI could be reported in the PUSCH for the subframe, such that no colliding sets would need to be dropped.

In some aspects, parallel PUCCH is supported and the handling of colliding CSI can be done on a per PUCCH basis. In such aspects, the parallel PUCCH can be utilized by the UE to transmit the sets of CSI.

In some aspects, both PUCCH and PUSCH are used by the UE to transmit CSI. The UE may prioritize the sets of CSI according to a prioritization scheme and transmit the highest priority CSI in the PUCCH for a subframe. Then, rather than automatically dropping other colliding sets of CSI for the subframe, the UE can piggyback the other sets of CSI on the PUSCH for the subframe.

Carrier aggregation can be used in combination with eICIC and/or CoMP techniques. When using carrier aggregation in combination with eICIC or CoMP, there may be two or more CCs where each CC may have two or more sets of periodic CSI report configurations. The UE may employ a prioritization scheme to handle the interaction of CSI for carrier aggregation with the CSI for eICIC or CoMP. In one exemplary prioritization scheme, the UE first performs prioritization within each CC to prioritize the sets of CSI for eICIC or CoMP for the CC, and then performs prioritization over different CCs to prioritize the CSI for carrier aggregation. Thus, a UE may perform prioritization within each CC followed by prioritization over different CCs. This allows for handling CSI even when there is an interaction between carrier aggregation and eICIC or CoMP.

Figures 6, 7:
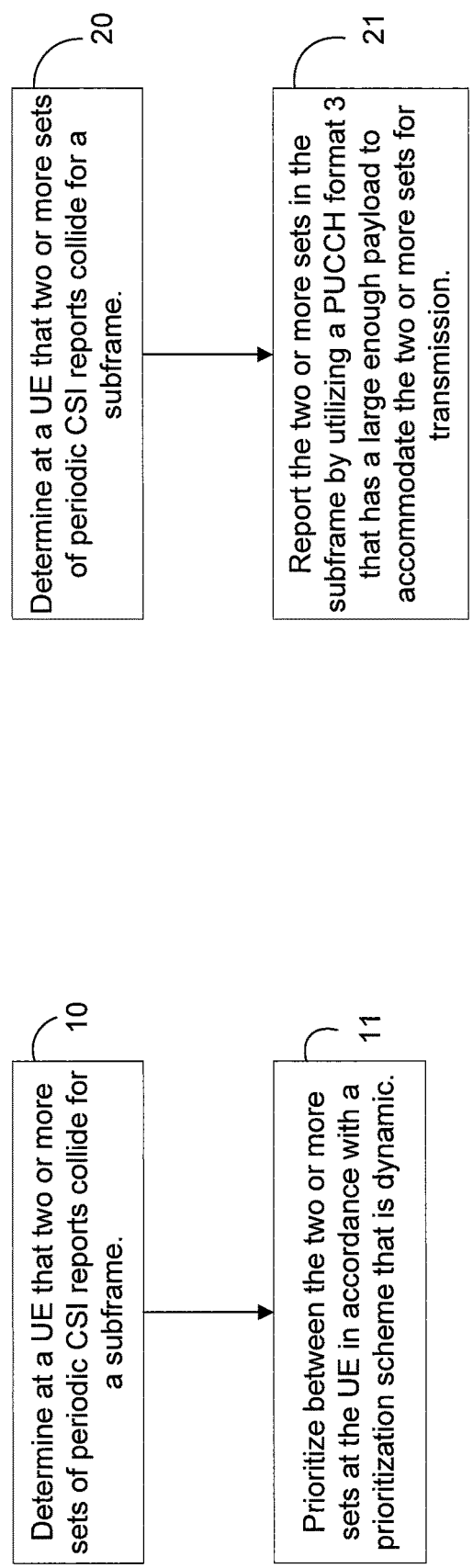
FIG. 6 is a flowchart of a method in accordance with an aspect.
FIG. 7 is a flowchart of a method in accordance with an aspect.

FIG. 6 is a flowchart of a method in accordance with an aspect. With reference to FIGS. 2 and 6, in step 10 the UE 120 determines that two or more sets of periodic CSI reports collide for a subframe, and in step 11 the UE 120 prioritizes between the two or more sets in accordance with a prioritization scheme that is dynamic.

FIG. 7 is a flowchart of a method in accordance with an aspect. With reference to FIGS. 2 and 7, in step 20 the UE 120 determines that two or more sets of periodic CSI reports collide for a subframe, and in step 21 the UE 120 reports the two or more sets in the subframe by utilizing a PUCCH format 3 that has a large enough payload to accommodate the two or more sets for transmission.

Figures 8, 9:
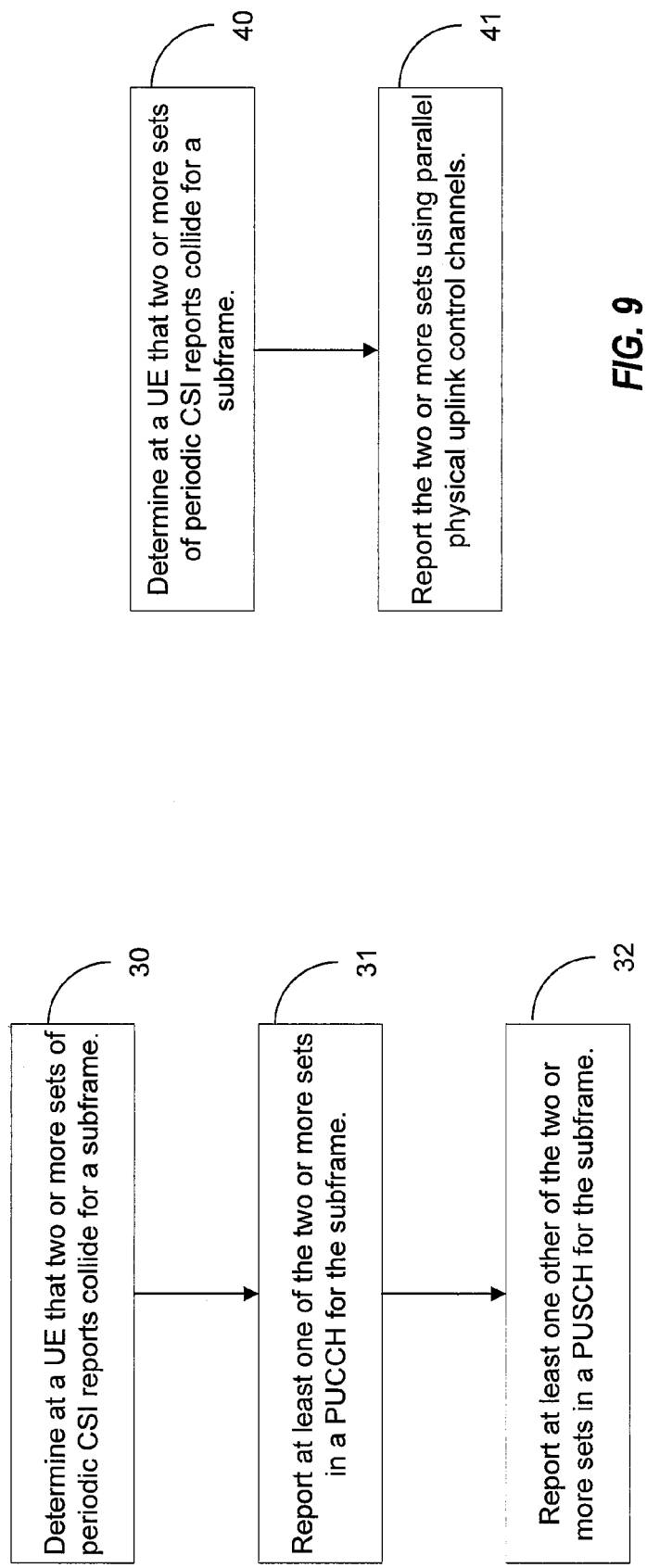
FIG. 8 is a flowchart of a method in accordance with an aspect.
FIG. 9 is a flowchart of a method in accordance with an aspect.

FIG. 8 is a flowchart of a method in accordance with an aspect. With reference to FIGS. 2 and 8, in step 30 the UE 120 determines that two or more sets of periodic CSI reports collide for a subframe, and in step 31 the UE 120 reports at least one of the two or more sets in a PUCCH for the subframe, and in step 32 the UE 120 reports at least one other of the two or more sets in a PUSCH for the subframe.

FIG. 9 is a flowchart of a method in accordance with an aspect. With reference to FIGS. 2 and 9, in step 40 the UE 120 determines that two or more sets of periodic CSI reports collide for a subframe, and in step 41 the UE 120 reports the two or more sets using parallel physical uplink control channels.

FIG. 10 is a flowchart of a method in accordance with an aspect. With reference to FIGS. 2 and 10, in step 50 the UE 120 determines that there is a collision of periodic CSI reports within a CC and that there is a collision of CSI reports for two or more CCs, and in step 51 the UE 120 performs prioritization of the CSI reports within each CC, and in step 52 the UE 120 performs prioritization of CSI reports for the different CCs.

FIG. 11 is a flowchart of a method in accordance with an aspect. With reference to FIGS. 2 and 11, in step 60 the UE 120 receives at least first and second CSI reporting configurations corresponding to a first base station and a second base station, respectively. In step 61, the UE 120 determines a collision in CSI reporting based on the first and second CSI reporting configurations. In step 62, the UE 120 prioritizes among CSI for the first and the second base station when there is a collision. In step 63, the UE 120 sends a CSI report based on a result of the prioritizing.

In some aspects, the transmissions by the first and second base stations comprise transmissions on multiple downlink component carriers. In some aspects, the prioritizing comprises a prioritization among multiple component carriers and a prioritization among base stations. In some aspects, the first and second base station comprise a CoMP measurement set of the user equipment. In some aspects, the prioritizing comprises dropping CSI associated with the first base station or the second base station. In some aspects, sending the CSI report comprises sending a first CSI report on PUCCH and a second CSI report on PUSCH. In some aspects, the sending comprises sending the CSI report to a serving base station.

In some aspects, a first periodic CSI configuration is associated with a first base station and a second periodic CSI configuration is associated with a second base station. In such aspects, these configurations could result in a collision. In some aspects, there could be a prioritization at the base-station level, and a CSI report could be sent based on the result. In some aspects when there is carrier aggregation and multiple base stations, when prioritizing CSI reports there is prioritization among reporting sets for base stations and a prioritization among CCs in each set. In some aspects, the first and second base stations belong to CoMP reporting sets.

In some aspects, dynamic prioritization takes place at the level of a subframe at 1 ms intervals, such that a UE could apply different prioritization schemes for each subframe. In some aspects, a semi-static prioritization scheme changes when a base station sends an RRC to a UE to specify the scheme, which may take place on the order of hundreds of milliseconds. Thus, a dynamic prioritization scheme may change more rapidly than a semi-static prioritization scheme.

FIG. 12 is a flowchart illustrating further aspects of CSI report prioritization according to the present disclosure. At block 1200, a UE determines a CSI reporting configuration for at least a first and second report set in relation to a first CC utilized with eICIC or a CoMP transmission. At block 1201, the UE detects a collision of two or more CSI reports within the first CSI report set, wherein each of the first and second CSI report sets includes a multiple CSI report types for the first CC. The UE performs a report type prioritization, at block 1202, based at least in part on the CSI report types of the colliding CSI reports of the first set in the first CC. At block 1203, a determination is made that there is a collision of CSI reports between the prioritized CSI reports of the first and second CSI report sets for the first CC. In response to the collision between sets, the UE performs a set prioritization, in block 1204, of the first and second CSI report sets.

In implementing the aspects of the present disclosure as illustrated in FIG. 12, the UE is faced not only with CSI report collision within one of the CSI reporting sets, but another collision with a CSI report identified for transmission in another CSI reporting set. A collision may also have occurred within the CSI reports identified for transmission in the other CSI reporting set. Each of these collisions, unlike previous collision resolution issues occurs within a single CC. As illustrated in FIG. 12, the UE resolves the collision within the first CSI reporting set through a report type prioritization, which may occur according to any of the prioritization schemes disclosed herein. Once the prioritized CSI report for the first set has been determined, the UE will resolve the collision between that prioritized CSI report and potentially another prioritized CSI report scheduled for the other CSI reporting set, again, each within the same CC. The set prioritization may use various of the prioritization schemes as described herein as well.

FIG. 13 is a functional block diagram illustrating example blocks for detecting CSI report collisions and performing report prioritization according to the present disclosure. The example illustrated in FIG. 13 includes multiple CCs scheduled for various sets of CSI reporting types. The initial process that the UE undertakes conforms to the example blocks illustrated in FIG. 12. After resolving the set collision through the set prioritization of block 1204, the UE may further determine, at block 1300, that there is a multi-carrier collision of CSI reports with respect to the first CC and the other CCs. In response to such a multi-carrier collision, the UE performs a multi-carrier prioritization, at block 1301, of the first and second CC prioritized CSI reports. Accordingly, the multiple CCs may each have multiple CSI reporting sets designated for each CC. The UE systematically resolves the collisions by first resolving the collisions within each CSI reporting set, then resolving the collision between prioritized CSI reports of the colliding CSI reporting sets, and then, when detected, resolves the collision between the prioritized CSI reports scheduled for the multiple carriers.

Figure 14:
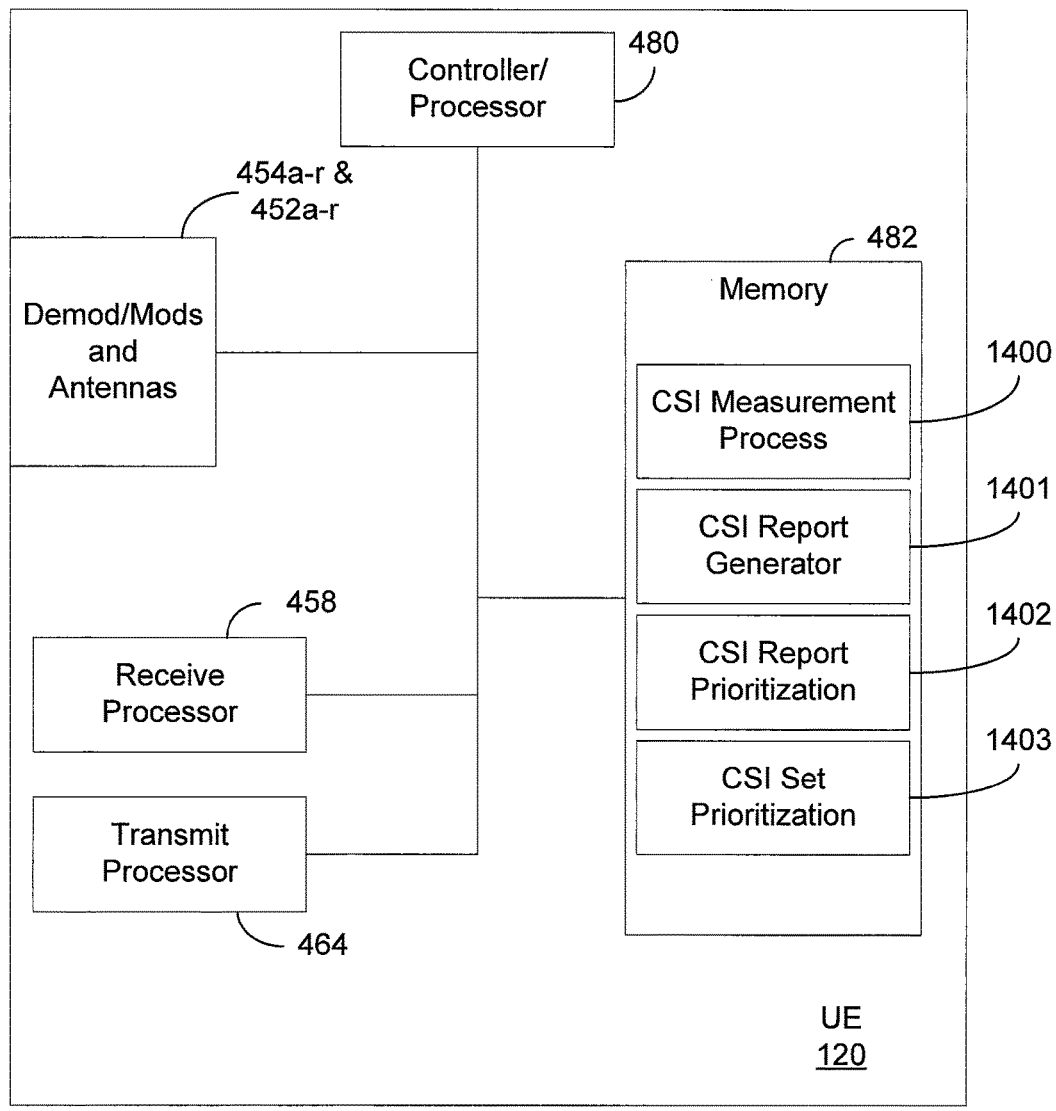
FIG. 14 is a block diagram illustrating a detail of a UE configured according to one aspect of the present disclosure.

FIG. 14 is a block diagram illustrating a UE 120 configured according to one aspect of the present disclosure. UE 120, as also depicted in FIG. 2, includes a controller/processor 480. Controller/processor 480 controls the components and executes various software, firmware, or other logic that implements the functionality and features of UE 120. The software, firmware, or other logic may be stored in a memory, such as memory 482, which is coupled to controller/processor 480. Controller/processor 480 accesses memory 482 to execute CSI measurement process 1400. The executing CSI measurement process 1400 provides information to determine the CSI reporting configuration for multiple CSI reporting sets related to a particular CC. The combination of these components and acts may provide means for determining a CSI reporting configuration for at least a first CSI report set and a second CSI report set in relation to a first CC utilized with the eICIC or the CoMP transmission.

Signals received over the demodulator/modulators and antennas 454a-r & 452a-r are analyzed using receive processor 458 and CSI reports on such signal/channel qualities are generated with controller/processor 480 executing CSI report generator 1401, stored in memory 482, based on the measurements detected through the signal analysis. Based on the CSI report scheduling determined through the reporting configuration, controller/processor 480 may detect when multiple CSI reports are scheduled for simultaneous transmission. The combination of these components and acts may provide means for detecting a collision of two or more CSI reports within the first CSI report set, wherein each of the first CSI report set and the second CSI report set include a plurality of CSI report types for the first CC.

With a collision of CSI reports identified for the first CSI reporting set for the CC, controller/processor 480 accesses CSI report prioritization scheme 1402, stored in memory 482, in order to resolve the collision. CSI report prioritization scheme 1402 may include various of the prioritization schemes disclosed herein. The combination of these components and acts may provide means for performing report type prioritization based at least in part on CSI report types of the colliding two or more CSI reports of the first CSI report set;

The CSI report scheduling determined through the reporting configuration may also allow controller/processor 480 to detect when a CSI report for multiple of the CSI report sets are scheduled for simultaneous transmission on the same CC. The combination of these components and acts may provide means for determining that there is a set collision of CSI reports with respect to a first prioritized CSI report of the first CSI report set and a second prioritized CSI report of the second CSI report set; and With a set collision of CSI reports identified for the first and second CSI reporting set for the same CC, controller/processor 480 accesses CSI report prioritization scheme 1402, stored in memory 482, in order to resolve the collision. CSI report prioritization scheme 1402 may include various of the prioritization schemes disclosed herein. The prioritized CSI report may then be transmitted through transmit processor 454 and demodulator/modulators and antennas 454a-r & 452a-r, under control of controller/processor 480. The combination of these components and acts may provide means for performing set prioritization of the first CSI report set and the second CSI report set.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of methods or algorithms described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In the some aspects, the processor and the storage medium may reside as discrete components in a user terminal.

In one or more exemplary designs, the functions described may be implemented in hardware, software, firmware, or any combination thereof. If implemented in software, the functions may be stored as one or more instructions or code on a non-transitory computer-readable storage medium. A storage media may be any available media that can be accessed by a general purpose or special purpose computer or processor. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure discusses illustrative aspects, it should be noted that various changes and modifications could be made herein and that the aspects are exemplary. Additionally, all or a portion of any aspect may be utilized with all or a portion of any other aspects, unless stated otherwise.

What is claimed is:

1. A method performed by a user equipment (UE) configured for at least one of enhanced inter-cell interference coordination (eICIC) or coordinated multipoint (CoMP) transmission in a wireless network, the method comprising: determining a channel state information (CSI) reporting configuration for at least a first CSI report set and a second CSI report set associated with a first component carrier (CC) utilized with the eICIC or the CoMP transmission; detecting a report collision between CSI reports within the first CSI report set, wherein the detecting the report collision within the first CSI report set includes detecting that a first CSI report in the first CSI report set collides with a second CSI report in the first CSI report set, wherein each of the first CSI report set and the second CSI report set includes a plurality of CSI report types for the first CC; performing report type prioritization of the first CSI report set based at least in part on CSI report types of the colliding first CSI report in the first CSI report set and second CSI report in the first CSI report set to generate a prioritized first CSI report set; determining that there is a set collision between CSI report sets within the first CC, wherein the determining that there is a set collision within the first CC includes determining that a first prioritized CSI report in the prioritized first CSI report set collides with a first CSI report in the second CSI report set; and performing set prioritization of the prioritized first CSI report set and the second CSI report set.

2. The method of claim 1, wherein the first and second CSI report sets comprise CSI reports corresponding to sets of eICIC measurement subframes for the first CC.

3. The method of claim 1, wherein the first and second CSI report sets comprise CSI reports for the CoMP transmission.

4. The method of claim 1, wherein the report type prioritization comprises:
a first priority to one of: a rank indicator (RI) report, or a wideband precoding matrix indicator (PMI) report;
a second priority to one of: a wideband channel quality indicator (CQI) report, or a PMI report; and
a third priority to one of: a sub-band CQI report, or a sub-band PMI report.

5. The method of claim 1, wherein the set prioritization is based on the report type prioritization of the first and second prioritized CSI reports.

6. The method of claim 1, wherein a tie breaker for the set prioritization comprises:
a first priority to a CSI report set having a lowest set index; and
a next priority to a next CSI report set having a next lowest set index.

7. The method of claim 1, wherein a tie breaker for the set prioritization changes for different subframes such that the set collision is resolved differently for the different subframes.

8. The method of claim 1, wherein a tie breaker for the set prioritization, when the first prioritized CSI report in the prioritized first CSI report set and the first CSI report in the second CSI report set have a same set prioritization level, dynamically changes for different subframes such that one of the first prioritized CSI report set and the second CSI report set are favored in the different subframes.

9. The method of claim 1, wherein a first prioritized CSI report of a highest priority CSI report set after set prioritization is transmitted in a subframe and any prioritized CSI reports of any lower priority CSI report sets are dropped.

10. The method of claim 1, wherein a first prioritized CSI report of a highest priority CSI report set after set prioritization is transmitted in a physical uplink control channel (PUCCH) for a subframe and one or more prioritized CSI reports of one or more lower priority CSI report sets after set prioritization are piggybacked for transmission on a physical uplink shared channel (PUSCH) for the subframe.

11. The method of claim 1, further comprising:
transmitting the first CSI report set and second CSI report set in a subframe by utilizing a physical uplink control channel (PUCCH) format 3.

12. The method of claim 1, further comprising:
transmitting the first CSI report set and second CSI report set in a subframe by utilizing parallel physical uplink control channels (PUCCHs).

13. The method of claim 1, further comprising:
determining that there is a multi-carrier collision of CSI reports with respect to the first CC and a second CC; and
performing multi-carrier prioritization of CSI reports for the first CC and the second CC.

14. The method of claim 13, wherein the multi-carrier prioritization of CSI reports comprises:

a first priority to a first CC having a lowest CC index; and
a next priority to a next CC having a next lowest CC index.

15. The method of claim 13, wherein the multi-carrier prioritization is based on the report type prioritization of one or more prioritized CSI reports from each of the first and second CCs.

16. The method of claim 13, wherein the first CC and the second CC are configured for carrier aggregation (CA).

17. The method of claim 13, wherein a first prioritized CSI report of a highest priority CSI report set after set prioritization and multi-carrier prioritization is transmitted in a subframe and any prioritized CSI reports of lower priority CSI report sets and lower priority CCs are dropped.

18. The method of claim 13, wherein a first prioritized CSI report of a highest priority CSI report set after set prioritization and multi-carrier prioritization is transmitted in a physical uplink control channel (PUCCH) for a subframe and one or more prioritized CSI reports of one or more lower priority CSI report sets and one or more lower priority CCs after set prioritization and multi-carrier prioritization are piggybacked for transmission on a physical uplink shared channel (PUSCH) for the subframe.

19. The method of claim 13, further comprising:
transmitting one or more prioritized CSI reports for one or more CSI report sets for each of one or more CCs in a subframe by utilizing a physical uplink control channel (PUCCH) format 3.

20. The method of claim 13, further comprising:
transmitting one or more prioritized CSI reports for one or more CSI report sets for each of one or more CCs in a subframe by utilizing parallel physical uplink control channels (PUCCHs).

21. An user equipment (UE) apparatus configured for at least one of enhanced inter-cell interference coordination (eICIC) or coordinated multipoint (CoMP) transmission in a wireless network, the apparatus comprising: means for determining a channel state information (CSI) reporting configuration for at least a first CSI report set and a second CSI report set associated with a first component carrier (CC) utilized with the eICIC or the CoMP transmission; means for detecting a report collision between CSI reports within the first CSI report set, wherein the detecting the report collision within the first CSI report set includes detecting that a first CSI report in the first CSI report set collides with a second CSI report in the first CSI report set, wherein each of the first CSI report set and the second CSI report set includes a plurality of CSI report types for the first CC; means for performing report type prioritization of the first CSI report set based at least in part on CSI report types of the colliding first CSI report in the first CSI report set and second CSI report in the first CSI report set to generate a prioritized first CSI report set; means for determining that there is a set collision between CSI report sets within the first CC, wherein the determining that there is a set collision within the first CC includes determining that a first prioritized CSI report in the prioritized first CSI report set collides with a first CSI report in the second CSI report set; and means for performing set prioritization of the prioritized first CSI report set and the second CSI report set.

22. The apparatus of claim 21, wherein the first and second CSI report sets comprise CSI reports corresponding to sets of eICIC measurement subframes for the first CC.

23. The apparatus of claim 21, wherein the first and second CSI report sets comprise CSI reports for the CoMP transmission.

24. The apparatus of claim 21, wherein the report type prioritization comprises:
a first priority to one of: a rank indicator (RI) report, or a wideband precoding matrix indicator (PMI) report;
a second priority to one of: a wideband channel quality indicator (CQI) report, or a PMI report; and
a third priority to one of: a sub-band CQI report, or a sub-band PMI report.

25. The apparatus of claim 21, wherein the set prioritization is based on the report type prioritization of the first and second prioritized CSI reports.

26. The apparatus of claim 21, wherein a tie breaker for the set prioritization comprises:
a first priority to a CSI report set having a lowest set index; and
a next priority to a next CSI report set having a next lowest set index.

27. The apparatus of claim 21, wherein a tie breaker for the set prioritization changes for different subframes such that the set collision is resolved differently for the different subframes.

28. The apparatus of claim 21, wherein a tie breaker for the set prioritization, when the first prioritized CSI report in the prioritized first CSI report set and the first CSI report in the second CSI report set have a same set prioritization level, dynamically changes for different subframes such that one of the first CSI report set and the second CSI report set are favored in the different subframes.

29. The apparatus of claim 21, wherein a first prioritized CSI report of a highest priority CSI report set after set prioritization is transmitted in a subframe and any prioritized CSI reports of any lower priority CSI report sets are dropped.

30. The apparatus of claim 21, wherein a first prioritized CSI report of a highest priority CSI report set after set prioritization is transmitted in a physical uplink control channel (PUCCH) for a subframe and one or more prioritized CSI reports of one or more lower priority CSI report sets after set prioritization are piggybacked for transmission on a physical uplink shared channel (PUSCH) for the subframe.

31. The apparatus of claim 21, further comprising:
means for transmitting the first CSI report set and second CSI report set in a subframe by utilizing a physical uplink control channel (PUCCH) format 3.

32. The apparatus of claim 21, further comprising:
means for transmitting the first CSI report set and second CSI report set in a subframe by utilizing parallel physical uplink control channels (PUCCHs).

33. The apparatus of claim 21, further comprising:
means for determining that there is a multi-carrier collision of CSI reports with respect to the first CC and a second CC; and
means for performing multi-carrier prioritization of CSI reports for the first CC and the second CC CSI reports.

34. The apparatus of claim 33, wherein the multi-carrier prioritization of CSI reports comprises:
a first priority to a first CC having a lowest CC index; and
a next priority to a next CC having a next lowest CC index.

35. The apparatus of claim 33, wherein the first CC and the second CC are configured for carrier aggregation (CA).

36. The apparatus of claim 33, wherein a first prioritized CSI report of a highest priority CSI report set after set prioritization and multi-carrier prioritization is transmitted in a subframe and any prioritized CSI reports of lower priority CSI report sets and lower priority CCs are dropped.

37. The apparatus of claim 33, wherein a first prioritized CSI report of a highest priority CSI report set after set prioritization and multi-carrier prioritization is transmitted in a physical uplink control channel (PUCCH) for a subframe and one or more prioritized CSI reports of one or more lower priority CSI report sets and one or more lower priority CCs after set prioritization and multi-carrier prioritization are piggybacked for transmission on a physical uplink shared channel (PUSCH) for the subframe.

38. The apparatus of claim 33, further comprising:
means for transmitting one or more prioritized CSI reports for one or more CSI report sets for each of one or more CCs in a subframe by utilizing a physical uplink control channel (PUCCH) format 3.

39. The apparatus of claim 33, further comprising:
means for transmitting one or more prioritized CSI reports for one or more CSI report sets for each of one or more CCs in a subframe by utilizing parallel physical uplink control channels (PUCCHs).

40. An apparatus comprising:
at least one processor; and
a memory coupled to the at least one processor,
wherein the at least one processor is configured to:
determine a channel state information (CSI) reporting configuration for at least a first CSI report set and a second CSI report set associated with a first component carrier (CC) utilized with an enhanced inter-cell interference coordination (eICIC) or coordinated multipoint transmission (CoMP);
detect a collision of CSI reports between a first CSI report in the first CSI report set and a second CSI report in the first CSI report set, wherein each of the first CSI report set and the second CSI report set includes a plurality of CSI report types for the first CC;
perform report type prioritization of the first report set based at least in part on CSI report types of the colliding first CSI report in the first CSI report set and second CSI report in the first CSI report set to generate a prioritized first CSI report set;
determine that there is a set collision of CSI reports between a first prioritized CSI report in the prioritized first CSI report set and a first CSI report in the second CSI report set; and
perform set prioritization of the prioritized first CSI report set and the second CSI report set.

41. The apparatus of claim 40, wherein the first and second CSI report sets comprise CSI reports corresponding to sets of eICIC measurement subframes for the first CC.

42. The apparatus of claim 40, wherein the first and second CSI report sets comprise CSI reports for the CoMP transmission.

43. The apparatus of claim 40, wherein a tie breaker for the set prioritization comprises:
a first priority to a CSI report set having a lowest set index; and
a next priority to a next CSI report set having a next lowest set index.

44. The apparatus of claim 40, wherein a first prioritized CSI report of a highest priority CSI report set after set prioritization is transmitted in a subframe and any prioritized CSI reports of any lower priority CSI report sets are dropped.

45. The apparatus of claim 40, wherein a first prioritized CSI report of a highest priority CSI report set after set prioritization is transmitted in a physical uplink control channel (PUCCH) for a subframe and one or more prioritized CSI reports of one or more lower priority CSI report sets after set prioritization are piggybacked for transmission on a physical uplink shared channel (PUSCH) for the subframe.

46. The apparatus of claim 40, wherein the at least one processor is further configured to:
transmit the first CSI report set and second CSI report set in a subframe by utilizing a physical uplink control channel (PUCCH) format 3.

47. The apparatus of claim 40, wherein the at least one processor is further configured to:
transmit the first CSI report set and second CSI report set in a subframe by utilizing parallel physical uplink control channels (PUCCHs).

48. The apparatus of claim 40, wherein the at least one processor is further configured to:
determine that there is a multi-carrier collision of CSI reports with respect to the first CC and a second CC; and
perform multi-carrier prioritization of the first CC and the second CC CSI reports.

49. The apparatus of claim 48, wherein the multi-carrier prioritization of CSI reports comprises:
a first priority to a first CC having a lowest CC index; and
a next priority to a next CC having a next lowest CC index.

50. The apparatus of claim 48, wherein the first CC and the second CC are configured for carrier aggregation (CA).

51. The apparatus of claim 48, wherein a first prioritized CSI report of a highest priority CSI report set after set prioritization and multi-carrier prioritization is transmitted in a physical uplink control channel (PUCCH) for a subframe and one or more prioritized CSI reports of one or more lower priority CSI report sets and one or more lower priority CCs after set prioritization and multi-carrier prioritization are piggybacked for transmission on a physical uplink shared channel (PUSCH) for the subframe.

52. The apparatus of claim 48, wherein the at least one processor is further configured to:
transmit one or more prioritized CSI reports for one or more CSI report sets for each of one or more CCs in a subframe by utilizing parallel physical uplink control channels (PUCCHs).

53. A non-transitory computer-readable storage medium comprising:
code for causing a computer to:
determine a channel state information (CSI) reporting configuration for at least a first CSI report set and a second CSI report set associated with a first component carrier (CC) utilized with an enhanced inter-cell interference coordination (eICIC) or coordinated multipoint transmission (CoMP) transmission;
detect a collision of CSI reports between a first CSI report in the first CSI report set and a second CSI report in the first CSI report set, wherein each of the first CSI report set and the second CSI report set includes a plurality of CSI report types for the first CC;
perform report type prioritization of the first report set based at least in part on CSI report types of the colliding first CSI report in the first CSI report set and second CSI report in the first CSI report set to generate a prioritized first CSI report set;
determine that there is a set collision of CSI reports between a first prioritized CSI report in the prioritized first CSI report set and a first CSI report in the second CSI report set; and perform set prioritization of the prioritized first CSI report set and the second CSI report set.

54. The non-transitory computer-readable storage medium of claim 53, wherein the first and second CSI report sets comprise CSI reports corresponding to sets of eICIC measurement subframes for the first CC.

55. The non-transitory computer-readable storage medium of claim 53, wherein the first and second CSI report sets comprise CSI reports for the CoMP transmission.

56. The non-transitory computer-readable storage medium of claim 53, wherein a tie breaker for the set prioritization comprises:
   a first priority to a CSI report set having a lowest set index; and
   a next priority to a next CSI report set having a next lowest set index.

57. The non-transitory computer-readable storage medium of claim 53, wherein a first prioritized CSI report of a highest priority CSI report set after set prioritization is transmitted in a subframe and any prioritized CSI reports of any lower priority CSI report sets are dropped.

58. The non-transitory computer-readable storage medium of claim 53, wherein a first prioritized CSI report of a highest priority CSI report set after set prioritization is transmitted in a physical uplink control channel (PUCCH) for a subframe and one or more prioritized CSI reports of one or more lower priority CSI report sets after set prioritization are piggybacked for transmission on a physical uplink shared channel (PUSCH) for the subframe.

59. The non-transitory computer-readable storage medium of claim 53, further comprising code for causing a computer to:
   transmit the first CSI report set and second CSI report set in a subframe by utilizing parallel physical uplink control channels (PUCCHs).

60. The non-transitory computer-readable storage medium of claim 53, further comprising code for causing a computer to:
   determine that there is a multi-carrier collision of CSI reports with respect to the first CC and a second CC; and
   perform multi-carrier prioritization of CSI reports for the first CC and the second CC CSI reports.

61. The non-transitory computer-readable storage medium of claim 60, wherein the multi-carrier prioritization of CSI reports comprises:
   a first priority to a first CC having a lowest CC index; and
   a next priority to a next CC having a next lowest CC index.

62. The non-transitory computer-readable storage medium of claim 60, wherein the first CC and the second CC are configured for carrier aggregation (CA).

63. The non-transitory computer-readable storage medium of claim 60, wherein a first prioritized CSI report of a highest priority CSI report set after set prioritization and multi-carrier prioritization is transmitted in a physical uplink control channel (PUCCH) for a subframe and one or more prioritized CSI reports of one or more lower priority CSI report sets and one or more lower priority CCs after set prioritization and multi-carrier prioritization are piggybacked for transmission on a physical uplink shared channel (PUSCH) for the subframe.

64. The non-transitory computer-readable storage medium of claim 60, further comprising code for causing a computer to:
   transmit one or more prioritized CSI reports for one or more CSI report sets for each of one or more CCs in a subframe by utilizing a physical uplink control channel (PUCCH) format 3.

65. The non-transitory computer-readable storage medium of claim 60, further comprising code for causing a computer to:
   transmit one or more prioritized CSI reports for one or more CSI report sets for each of one or more CCs in a subframe by utilizing parallel physical uplink control channels (PUCCHs).

* * * * *